(12) United States Patent
Chung et al.

(10) Patent No.: US 10,672,552 B2
(45) Date of Patent: Jun. 2, 2020

(54) ADHESIVE LAMINATE CORE MANUFACTURING APPARATUS

(71) Applicant: POSCO DAEWOO CORPORATION, Seoul (KR)

(72) Inventors: Il Gwen Chung, Seoul (KR); Sae Jong Lim, Cheonan-si (KR); Jang Hwan Seal, Cheonan-si (KR); Seung Chul Lee, Anyang-si (KR); Chang Don Park, Cheonan-si (KR); Jung Gyu Chi, Cheonan-si (KR); Jae Young Lee, Suwon-si (KR)

(73) Assignee: POSCO DAEWOO CORPORATION, Seoul (KR)

( * ) Notice: Subject to any disclaimer, the term of this patent is extended or adjusted under 35 U.S.C. 154(b) by 163 days.

(21) Appl. No.: 16/064,455

(22) PCT Filed: Aug. 11, 2016

(86) PCT No.: PCT/KR2016/008835
§ 371 (c)(1),
(2) Date: Jun. 21, 2018

(87) PCT Pub. No.: WO2017/111249
PCT Pub. Date: Jun. 29, 2017

(65) Prior Publication Data
US 2018/0374625 A1 Dec. 27, 2018

(30) Foreign Application Priority Data

Dec. 22, 2015 (KR) .......................... 10-2015-0183834
Mar. 23, 2016 (KR) .......................... 10-2016-0034723

(51) Int. Cl.
*H01F 27/245* (2006.01)
*B32B 7/12* (2006.01)
(Continued)

(52) U.S. Cl.
CPC ............. *H01F 27/245* (2013.01); *B32B 7/12* (2013.01); *B32B 37/00* (2013.01); *B32B 37/12* (2013.01);
(Continued)

(58) Field of Classification Search
CPC ........... H01F 41/0206; H01F 27/00–36; H01F 27/245
(Continued)

(56) References Cited

U.S. PATENT DOCUMENTS 4,464,826 A * 8/1984 Bair ...................... H02K 15/024
29/593
5,406,243 A * 4/1995 Jenkins ................. H01F 27/245
29/609
(Continued)

FOREIGN PATENT DOCUMENTS

JP          H5-304037 A      11/1993
JP       2009-297758 A      12/2009
(Continued)

OTHER PUBLICATIONS

International Search Report in International Appl. No. PCT/KR2016/008835, dated Dec. 19, 2016.

*Primary Examiner* — Tuyen T Nguyen
(74) *Attorney, Agent, or Firm* — Park, Kim & Suh, LLC

(57) ABSTRACT

Disclosed is an adhesive laminate core manufacturing apparatus for successively forming lamina members of a predetermined shape while allowing a strip-shaped material, of which the surface is coated with an adhesive layer, to pass therethrough, and successively manufacturing laminate cores comprising the lamina members integrated, per predetermined sheet, by interlaminar bonding. The adhesive laminate core manufacturing apparatus according to one aspect of the present invention comprises: a protrusion
(Continued)

forming unit pressing the material for the delamination of the laminate cores, so as to form interlaminar division protrusions on the surface of the material at each predetermined position along the longitudinal direction of the material; a blanking unit blanking the material so as to successively form the lamina members; and a lamination unit integrating the lamina members so as to successively manufacture the laminate cores. According to the present invention, the laminate cores, in which the predetermined sheets of the laminar members are integrated in an interlaminar bonding manner, can be continuously manufactured by using the strip-shaped material of which the surface is coated with the adhesive layer in advance.

20 Claims, 23 Drawing Sheets

(51) Int. Cl.
| | | |
|---|---|---|
| | H02K 15/02 | (2006.01) |
| | B32B 37/12 | (2006.01) |
| | B32B 37/00 | (2006.01) |
| | H01F 41/02 | (2006.01) |
| | H01F 3/02 | (2006.01) |

(52) U.S. Cl.
CPC ...... *B32B 37/1207* (2013.01); *B32B 37/1292* (2013.01); *H01F 3/02* (2013.01); *H01F 41/0206* (2013.01); *H01F 41/0233* (2013.01); *H02K 15/02* (2013.01); *B32B 2037/1215* (2013.01)

(58) Field of Classification Search
USPC ............... 336/65, 83, 210–215, 233–234
See application file for complete search history.

(56) References Cited

U.S. PATENT DOCUMENTS

| | | | |
|---|---|---|---|
| 5,799,387 A * | 9/1998 | Neuenschwander | B21D 28/02 |
| | | | 29/598 |
| 6,745,458 B2 | 6/2004 | Neuenschwander | |
| 8,276,426 B2 * | 10/2012 | Musat | B21D 28/22 |
| | | | 29/609 |

FOREIGN PATENT DOCUMENTS

| | | |
|---|---|---|
| KR | 10-1996-0003021 A | 1/1996 |
| KR | 10-2005-0077667 A | 8/2005 |
| KR | 10-2007-0074711 A | 7/2007 |
| KR | 10-2008-0067426 A | 7/2008 |
| KR | 10-2008-0067428 A | 7/2008 |
| KR | 10-2015-0136877 A | 12/2015 |

\* cited by examiner

FIG. 7
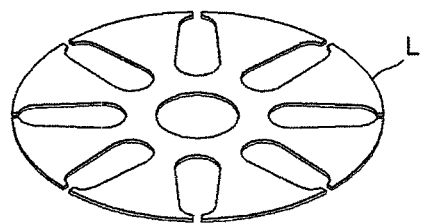
(a)
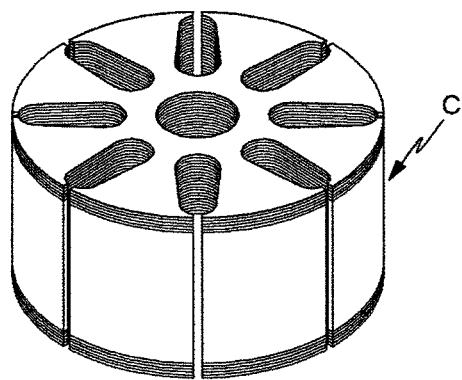
(b)

FIG. 12
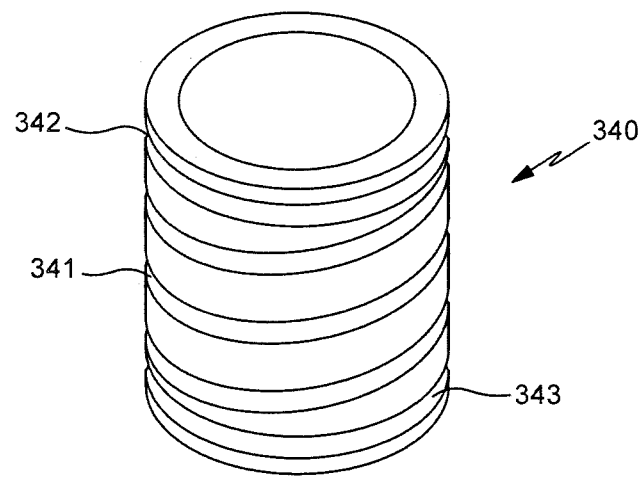
(a)
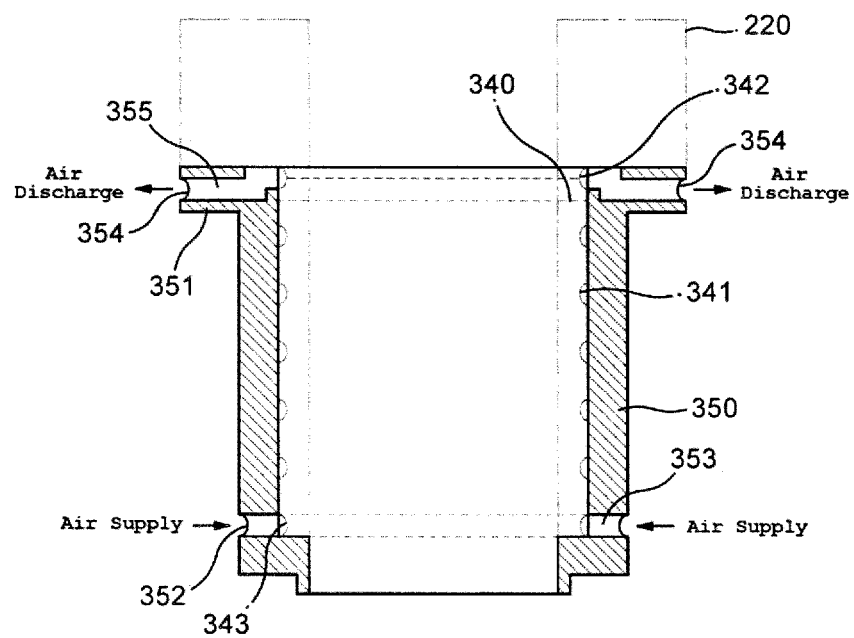
(b)

FIG. 20
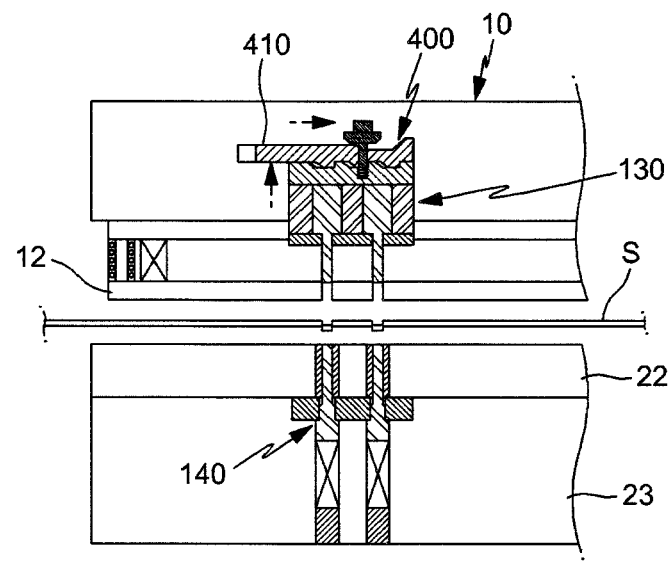
(a)
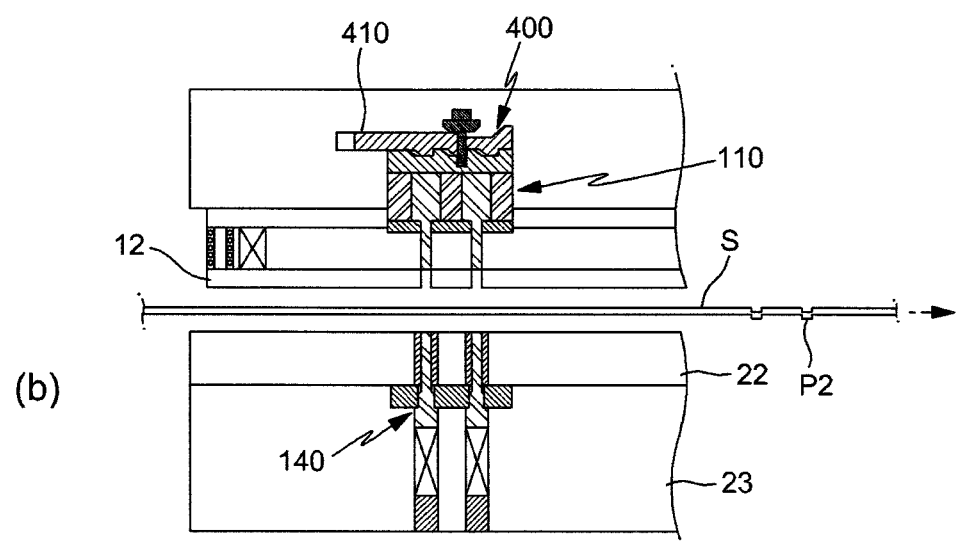
(b)

ADHESIVE LAMINATE CORE MANUFACTURING APPARATUS

CROSS-REFERENCE TO RELATED APPLICATIONS

This application is the National Stage filing under 35 U.S.C. 371 of International Application No. PCT/KR2016/008835, filed on Aug. 11, 2016, which claims the benefits of Korean Patent Application No. 10-2015-0183834, filed on Dec. 22, 2015, and Korean Patent Application No. 10-2016-0034723, filed on Mar. 23, 2016, the contents of which are all hereby incorporated by reference herein in their entirety.

TECHNICAL FIELD

The present invention relates to a core manufacturing apparatus for manufacturing a core of a motor or a generator and, more particularly, to an adhesive laminate core manufacturing apparatus for manufacturing a laminate core by interlayer adhesion between laminar members (thin sheets).

BACKGROUND ART

In general, a laminate core manufactured by laminating laminar members, e.g. thin metal sheets, in multiple layers and integrating the same is used as a rotor or a stator of a generator or a motor. As methods of manufacturing the laminate core, i.e., by laminating the laminar members and then integrally fixing the laminar members, a tap fixing method using interlock taps, a fixing method using welding, for example, laser welding, a rivet fixing method, etc. have been known. The laminate core forms at least a portion of a core for the rotor or a core for the stator The tap fixing method is disclosed as manufacturing technology of a laminate core in Patent Documents, i.e., Korean Patent Laid-open Publication Nos. 10-2008-0067426 and 10-2008-0067428. In manufacture of the laminate core using such a method, iron loss occurs, particularly, it is difficult to execute embossing due to thickness reduction in a material, i.e., a steel sheet, and thus it is limited as technology for manufacturing the laminate core. The above-described Patent Documents and Patent Documents which will be described later disclose various kinds and shapes of laminate core.

Recently, an adhesion fixing method, in which laminar members, each forming a unit thin sheet of a laminate core, are adhered to each other by an adhesive so as to be integrated, has been proposed. Such an adhesion fixing method is disclosed in Korean Patent Laid-open Publication No. 10-1996-0003021 and Japanese Patent Laid-open Publication No. H5-304037.

With reference to Japanese Patent Laid-open Publication No. H5-304037 among the above-described Patent Documents, a material for manufacturing a motor core, i.e., a steel sheet, is fed to a first press die and a second press die by a feed roller and, before the steel sheet is supplied to the first press die, an adhesive is applied to the surface of the steel sheet by an application roller and a nozzle.

Further, blanked members (laminar members) sequentially accumulated in the first press die and the second press die due to blanking of the material are integrated by the adhesive, thereby manufacturing an adhesive laminate core. The above-described adhesion fixing methods, i.e., the adhesive laminate core manufacturing method, may reduce manufacturing costs, as compared to the laser welding method, and correspond to thickness reduction in the steel sheet.

DISCLOSURE

Technical Problem

It is an object of the present invention to provide an adhesive laminate core manufacturing apparatus that is capable of continuously manufacturing a laminate for a core, i.e. a laminate core, for a motor or a generator using a strip-type material including an adhesive layer applied on the surface thereof.

Technical Solution

In accordance with an aspect of the present invention, there is provided an adhesive laminate core manufacturing apparatus for sequentially forming laminar members having a predetermined shape while transferring a strip-shaped material including an adhesive layer applied on the surface thereof by 1 pitch at each cycle and for sequentially manufacturing laminate cores, each including laminar members integrated in a predetermined number into one body by interlayer adhesion therebetween. The adhesive laminate core manufacturing apparatus includes a protrusion-forming unit for forming a protrusion for interlayer division on the surface of the material by pressing the material for division of the laminate cores whenever the material is transferred by a predetermined multiple of a pitch, a blanking unit for sequentially forming the laminar members by blanking the material, and a laminating unit for sequentially manufacturing the laminate cores by integrating the laminar members.

The blanking unit may include a blanking punch provided at an upper press die configured to be capable of being raised and lowered in order to press and blank the material, the blanking punch being disposed further downstream than the protrusion-forming unit in the transfer direction of the material, and a blanking die supported by a lower press die disposed under the upper press die, the blanking die including a blanking hole facing the blanking punch and being stacked on the laminating unit.

The protrusion-forming unit may be selectively synchronized with the blanking unit so as to periodically form the protrusion on the material at every predetermined number of iterations of blanking.

The protrusion-forming unit may comprise at least one of a first forming set and a second forming set. The first forming set comprises a lower forming die provided at the lower press die and an upper forming tool provided at the upper press die so as to face the lower forming die, and the second forming set comprises an upper forming die provided at the upper press die and a lower forming tool provided at the lower press die so as to face the upper forming die.

The lower forming die comprises a lower forming recess depressed downwards from a top surface of the lower forming die, and the upper forming die comprises an upper forming recess indented upwards from a bottom surface of the upper forming die.

The upper forming tool is provided at the upper press die so as to be capable of being raised and lowered, and the lower forming tool is provided at the lower press die so as to be capable of being raised and lowered.

The lower forming die and the upper forming die are respectively provided at the lower press die and the upper press die so as to be misaligned from each other by a predetermined distance in the transfer direction of the material, and the upper forming die is disposed further downstream than the lower forming die in the transfer direction of the material.

The first forming set is spaced apart from the second forming set by a distance of 1 pitch. More particularly, the top surface of the lower forming die and the bottom surface of the upper forming die have a planar symmetric relationship therebetween such that each of the top surface of the lower forming die and the bottom surface of the upper forming die is a mirror image of a remaining one thereof, and the upper forming die may be located at a position shifted by 1 pitch from a position directly above the lower forming die.

The upper press die comprises an upper frame configured to be capable of being raised and lowered and a pusher having a plate shape, the pusher being provided under the upper frame in order to press the material toward the lower press die, the upper forming tool is supported by the upper frame so as to press a top surface of the material by penetrating the pusher, and the lower forming die is supported by the upper frame so as to support the top surface of the material by penetrating the pusher.

The upper press die may comprise a plurality of bodies divided in the transfer direction of the material or a single integral body, and the lower press die may comprise a plurality of bodies divided in the transfer direction of the material or a single integral body.

The blanking punch is raised and lowered once by the upper press die whenever the material moves 1 pitch, and the protrusion-forming unit is selectively synchronized with the blanking unit so as to form the protrusion on the material at an interval equivalent to a multiple of a pitch in a longitudinal direction of the material.

The blanking die is provided at the lower press die so as to be spaced apart from the protrusion-forming unit by an N-pitch distance (N being a natural number equal to or greater than 1) in the transfer direction of the material. And, the laminating unit may be rotatably provided at the lower press die.

The protrusion-forming unit presses one surface of the material so as to form the protrusion for interlayer division on an opposite surface of the material for division of the laminate cores. More particularly, The protrusion-forming unit may comprises a protrusion-forming tool comprising a pressing protrusion having a flat distal end surface and a distal end portion having a uniform thickness in order to form the protrusion for interlayer division, the protrusion-forming tool being synchronized with the blanking unit so as to press the one surface of the material at a predetermined cycle, and a forming die comprising a protrusion-forming recess formed at a position facing the pressing protrusion, the protrusion-forming recess having a shape corresponding to a shape of the distal end portion of the pressing protrusion.

In accordance with another aspect of the present invention, there is provided an adhesive laminate core manufacturing apparatus including a protrusion-forming unit configured to press one surface of the material so as to form a protrusion for interlayer division on the opposite surface of the material for division of laminate cores, a blanking unit disposed further downstream than the protrusion-forming unit in the transfer direction of the material in order to sequentially form laminar members by blanking the material, and a laminating unit for sequentially manufacturing the laminate cores by integrating the laminar members, wherein the protrusion-forming unit includes a protrusion-forming tool including a pressing protrusion having a flat distal end surface and a distal end portion having a uniform thickness in order to form the protrusion for interlayer division, the protrusion-forming tool being synchronized with the blanking unit so as to press the one surface of the material at a predetermined cycle, and a forming die including a protrusion-forming recess formed at a position facing the pressing protrusion, the protrusion-forming recess having a shape corresponding to the shape of the distal end portion of the pressing protrusion.

The pressing protrusion of the protrusion-forming tool may be oriented downwards so as to press the top surface of the material downwards, and the forming die may be disposed under the protrusion-forming tool so as to support the bottom surface of the material. However, this arrangement may be reversed, that is, the protrusion-forming tool may be disposed under the forming die.

The adhesive laminate core manufacturing apparatus may further comprise an ejector installed in the protrusion-forming recess in order to separate the protrusion for interlayer division from the forming die, the ejector being elastically supported toward an entrance of the protrusion-forming recess.

The protrusion-forming tool is selectively lowered by an elevating device in order to press the one surface of the material at the predetermined cycle.

The protrusion-forming tool is provided at an upper support body and the forming die is provided at a lower support body, the upper support body is provided above the lower support body so as to be capable of being raised and lowered, the lower support body is provided under the upper support body so as to face the upper support body, the upper support body may be formed integrally with the upper press die or is spaced apart from the upper press die, and the lower support body may be formed integrally with the lower press die or is spaced apart from the lower press die.

Advantageous Effects

An adhesive laminate core manufacturing apparatus in accordance with one embodiment of the present invention has the effects described below.

First, in accordance with the embodiment of the present invention, a laminate core may be continuously manufactured by using a strip-type material including an adhesive layer applied on the surface thereof and integrating a predetermined number of laminar members into one body by interlayer adhesion between the laminar members.

Second, in accordance with the embodiment of the present invention, protrusions for interlayer division are formed on the surface of a strip-type material at a predetermined cycle in selective synchronization with a process of blanking the material, thus easily integrating a predetermined number of laminar members into one body and facilitating the manufacture and interlayer division of laminate cores.

Third, in accordance with the embodiment of the present invention, since a material is blanked at an interval of 1 pitch in the longitudinal direction thereof while being transferred by 1 pitch at each cycle and since a protrusion-forming unit is driven so as to form protrusions on the material at an interval equivalent to a multiple of a pitch, laminar members may be integrated in a predetermined number into one body, and the boundary between laminate cores may be accurately distinguished.

Fourth, in accordance with the embodiment of the present invention, in a laminating unit, a part in which laminar members are aligned and laminated, a part in which the laminar members are integrated and a part from which a laminate core is discharged are precisely interlocked with each other so as to be rotated integrally with each other, thus minimizing variation in the thickness of a laminate core and enabling the manufacture of a core with high precision.

DESCRIPTION OF DRAWINGS

The above and other objects, features and other advantages of the present invention will be more clearly understood from the following detailed description taken in conjunction with the accompanying drawings, in which:

FIG. 7 is a perspective view illustrating an exemplary laminar member and an exemplary adhesive laminate core that can be manufactured by the present invention;

FIG. 12 is a view illustrating the squeezer and the rotation housing shown in FIG. 9;

FIG. 20 is a view illustrating the state in which a protrusion-forming tool of the protrusion-forming unit shown in FIG. 3 is moved back (raised);

BEST MODE

Figure 1:
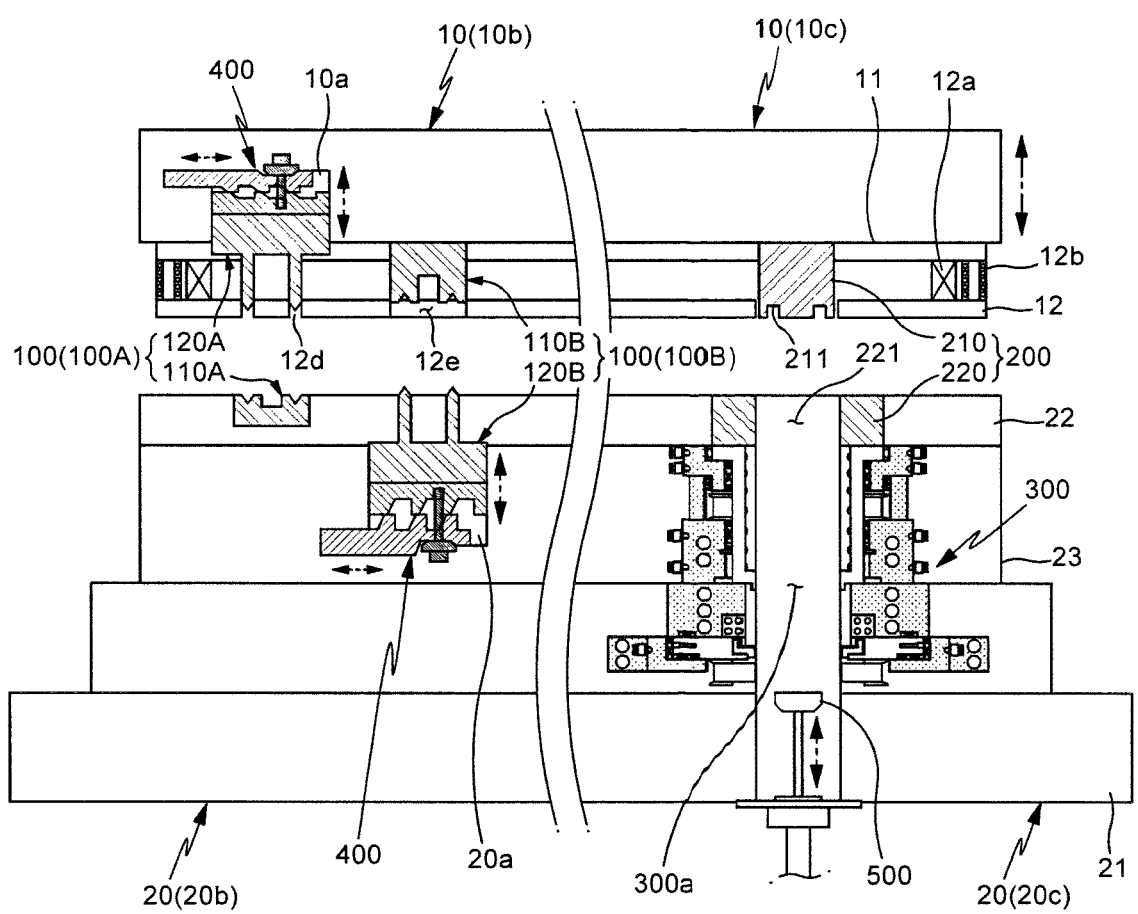
FIG. 1 is a longitudinal-sectional view schematically illustrating an adhesive laminate core manufacturing apparatus in accordance with one embodiment of the present invention, taken in the transfer direction of a material.

Hereinafter, preferred exemplary embodiments of the present invention by which objects of the present invention can be specifically implemented will be described with reference to the accompanying drawings. In the description of the present exemplary embodiments, the same terms and the same reference numerals are used to describe the same configurations, and additional descriptions thereof will be omitted.

The embodiments of the present invention relate to an adhesive laminate core manufacturing apparatus that manufactures a core of a motor, a generator, etc. by forming laminar members having a predetermined shape by blanking a strip-type material, which is continuously transferred by a predetermined distance, for example, 1 pitch, at each cycle and executing interlayer adhesion between the laminar members so as to integrate the laminar members.

More particularly, the embodiments of the present invention relate to an adhesive laminate core manufacturing apparatus that is capable of manufacturing the aforementioned core, i.e. a laminate core, using a strip-type material including an adhesive layer applied on the surface thereof (a steel sheet including an adhesive layer applied on the surface thereof for manufacturing a core). The laminate core forms at least one portion of a core for a stator or a rotor.

First, with reference to FIGS. 1 to 4, an adhesive laminate core manufacturing apparatus in accordance with one embodiment (a first embodiment) of the present invention will be described.

Figure 2:
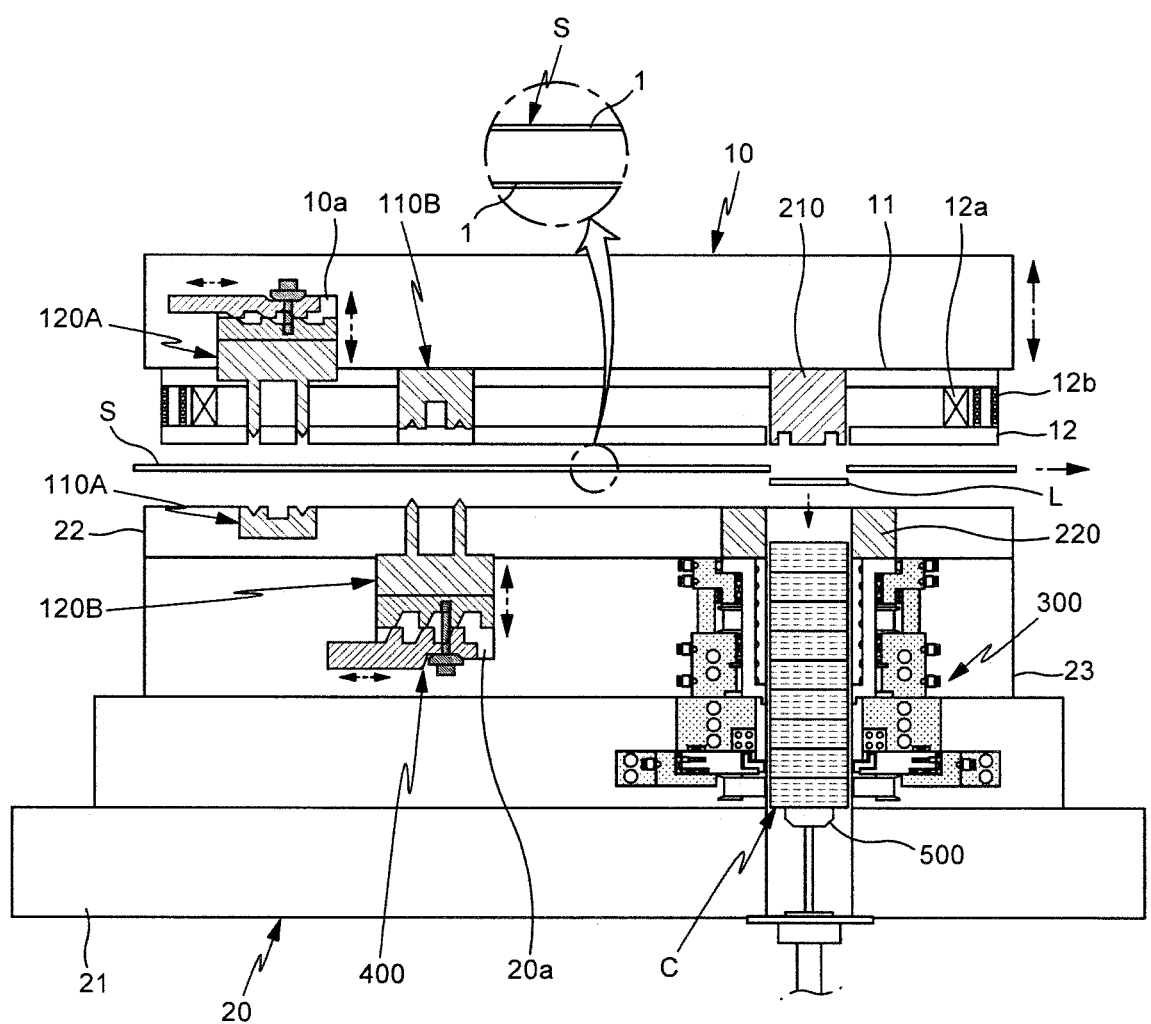
FIG. 2 is a view illustrating the state in which a material is supplied to the adhesive laminate core manufacturing apparatus shown in FIG. 1.
Figure 3:
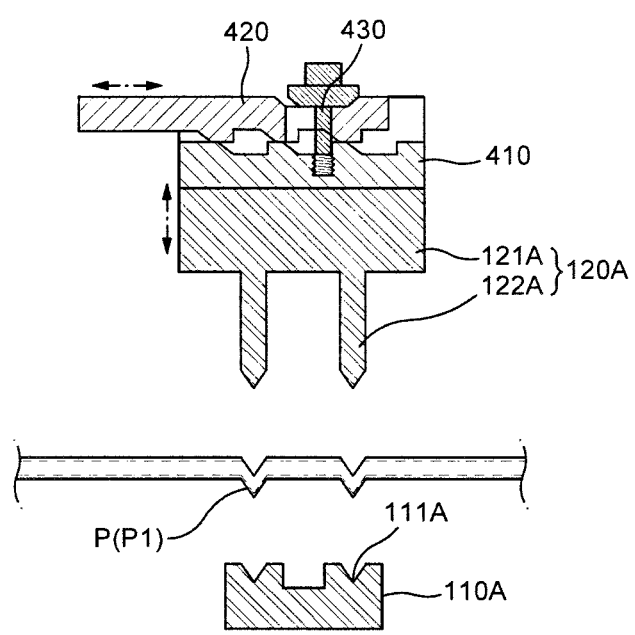
FIG. 3 is a view illustrating a first forming set, which is one embodiment of a protrusion-forming unit that is applicable to the adhesive laminate core manufacturing apparatus shown in FIG. 1.
Figure 4:
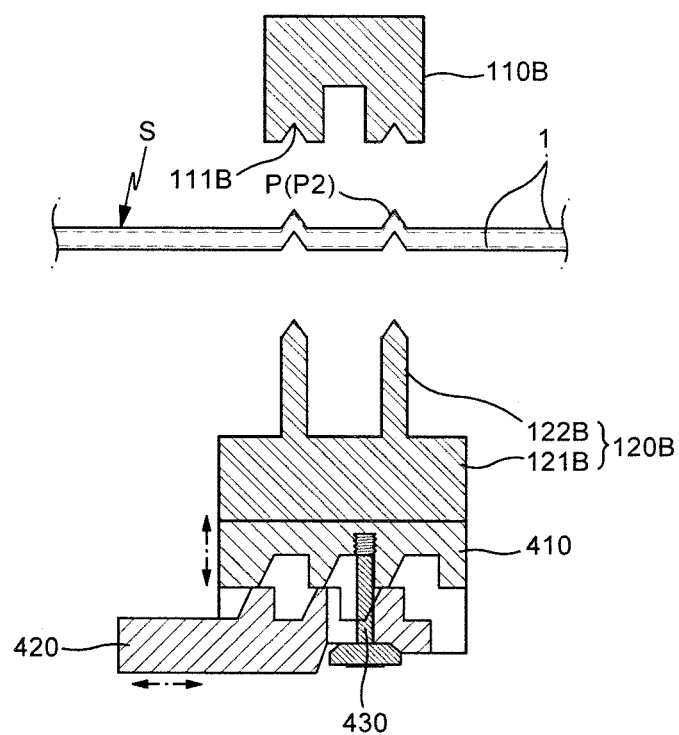
FIG. 4 is a view illustrating a second forming set, which is another embodiment of the protrusion-forming unit that is applicable to the adhesive laminate core manufacturing apparatus shown in FIG. 1.

In the drawings for explaining one embodiment of the present invention, FIG. 1 is a longitudinal-sectional view schematically illustrating an adhesive laminate core manufacturing apparatus in accordance with one embodiment of the present invention, taken in the transfer direction of a material, FIG. 2 is a view illustrating the state in which a material is supplied to the adhesive laminate core manufacturing apparatus shown in FIG. 1, FIG. 3 is a view illustrating a first forming set, which is one embodiment of a protrusion-forming unit that is applicable to the adhesive laminate core manufacturing apparatus shown in FIG. 1, and FIG. 4 is a view illustrating a second forming set, which is another embodiment of the protrusion-forming unit that is applicable to the adhesive laminate core manufacturing apparatus shown in FIG. 1.

The adhesive laminate core manufacturing apparatus (hereinafter, referred to as a 'core manufacturing apparatus') in accordance with the embodiments of the present invention is based on a press system that is capable of sequentially forming laminar members L having a predetermined shape using a strip-type material S, which includes an adhesive layer 1 applied on the surface thereof and is passed through the press system, and sequentially manufacturing laminate cores C including the laminar members, which are integrated in a predetermined number into one body by interlayer adhesion between the laminar members.

Referring to FIGS. 1 to 4, the adhesive laminate core manufacturing apparatus in accordance with one embodiment of the present invention includes a protrusion-forming unit 100 for dividing the laminate cores C into groups, a blanking unit 200 for sequentially forming the laminar members L through a blanking process, and a laminating unit 300 for forming the laminate core C by integrating the laminar members L in a predetermined number into one body.

When manufacturing the aforementioned laminate core C using the strip-type material S including the adhesive layer 1 applied on the surface thereof, the protrusion-forming unit 100 forms protrusions P, particularly protrusions for interlayer division, at predetermined positions in the longitudinal direction of the material S by pressing the material so as to divide the laminate cores C into groups. The protrusions P form a gap between neighboring laminar members in order to reduce the contact area between the laminar members.

The blanking unit 200 sequentially forms the laminar members L by blanking the material, and sequentially supplies the laminar members L to the laminating unit 300 in order to laminate the laminar members L in the laminating unit 300. The laminating unit 300 sequentially manufactures the laminate cores C by integrating the laminar members L, which are laminated in the vertical direction by the blanking process, in a predetermined number into one body.

In this embodiment, the blanking unit 200 includes a blanking punch 210 provided at an upper press die 10 and a blanking die 220 provided at a lower press die 20.

In more detail, the upper press die 10 is provided above the lower press die 20 so as to be movable in the vertical direction in order to press and blank the material S. The blanking punch 210 is mounted to the upper press die 10, and is disposed further downstream than the protrusion-forming unit 100 in the transfer direction of the material S. Therefore, the blanking punch 210 blanks the material S by ascending and descending with the upper press die 10.

The blanking die 220 has therein a blanking hole 221 that faces the blanking punch 210. The blanking die 220 is mounted to and supported by the lower press die 20, and is disposed on the laminating unit 300.

In this embodiment, the protrusion-forming unit 100 is configured to be selectively synchronized with the blanking unit 200 so as to form the aforementioned protrusions P on the surface of the material S at every predetermined number of iterations of blanking.

For example, the blanking punch 210 is raised and lowered once by the upper press die 10 whenever the material S moves 1 pitch. In other words, the material S passes through the space between the upper press die 10 and the lower press die 20 by 1 pitch for every stroke of the press, i.e. every stroke of the blanking punch 210, and the protrusion-forming process is executed at a predetermined timing before the blanking process.

The protrusion-forming unit 100 may be selectively synchronized with the blanking unit 200 so as to form the protrusions P on the material S at an interval equivalent to a multiple of a pitch in the longitudinal direction of the material S. In the case in which the laminate core C has a 10-layer lamination structure including 10 laminar members, the protrusions P are formed in a regular pattern on the surface of the material S at an interval of 10 pitches in the longitudinal direction of the material (the transfer direction of the material).

In this embodiment, the blanking die 220 is provided at the lower press die 20 so as to be spaced apart from the protrusion-forming unit 100 by an N-pitch distance (N being a natural number equal to or greater than 1) in the transfer direction of the material S.

The protrusion-forming unit 100 may include at least one of a first forming set 100A, which forms the protrusions P such that the protrusions protrude downwards, and a second forming set 100B, which forms the protrusions P such that the protrusions protrude upwards. In the description, the terms "first" and "second" are unrelated to the order or number of forming sets, and are merely used to distinguish the forming set provided at the lower press die 20 and the forming set provided at the upper press die 10 from each other.

On the assumption that the protrusions formed to protrude downwards from the surface of the material are referred to as lower protrusions P1 and that the protrusions formed to protrude upwards from the surface of the material are referred to as upper protrusions P2, the first forming set 100A forms the lower protrusions P1 on the material S, and the second forming set 100B forms the upper protrusions P2 on the material S. Therefore, the protrusion-forming unit 100 of the embodiment may also be referred to as an embossing apparatus.

The material S may be a material coated with the adhesive layer 1 on both surfaces (the top surface and the bottom surface) thereof, or may be a material coated with the adhesive layer on any one of the top surface and the bottom surface thereof. The apparatus of the embodiment is configured to manufacture a laminate core using the material S coated with the adhesive layer 1 on both surfaces thereof, and includes both the first forming set 100A and the second forming set 100B in order to facilitate division of the laminate cores C into groups. However, the invention is not limited thereto.

In other words, in the case in which the material S includes the adhesive layer 1 applied on both surfaces thereof, interlayer division of the laminate cores C into groups may be realized by only one of the first forming set 100A and the second forming set 100B. However, in the case in which the protrusions P are periodically formed on only one of the top surface and the bottom surface of the material S, at every predetermined pitch in the longitudinal direction of the material S, the interlayer adhesive force between the laminar members, which are integrated in a predetermined number into one body, may be relatively weakened.

In more detail, the first forming set 100A includes a lower forming die 110A, which is provided at the lower press die 20, and an upper forming tool 120A, which is provided at the upper press die 10 in order to press the top surface of the material S downwards. The upper forming tool 120A is located directly above the lower forming die 110A so as to face the lower forming die 110A, and ascends and descends with the upper press die 10.

The lower forming die 110A includes a lower forming recess 111A, which is depressed downwards from the top surface of the lower forming die 110A. In this embodiment, a plurality of lower forming recesses 111A is formed in the top surface of the lower forming die 110A.

The upper forming tool 120A is mounted to the upper press die 10 so as to be capable of being raised and lowered. In this embodiment, the upper forming tool 120A includes an upper tool base 121A, which is provided to be capable of being raised and lowered, and upper press portions 122A, which are provided at the upper tool base 121A. Each of the upper press portions 122A has a distal end (a lower end) that has a shape corresponding to the shape of a respective one of the lower forming recesses 111A.

The second forming set 100B includes an upper forming die 110B, which is provided at the upper press die 10, and a lower forming tool 120B, which is provided at the lower press die 20 in order to press the bottom surface of the material S upwards. The lower forming tool 120B is located directly under the upper forming die 110B so as to face the upper forming die 110B, and the upper forming die 110B ascends and descends with the upper press die 10.

The upper forming die 110B includes an upper forming recess 111B, which is indented upwards from the bottom surface of the upper forming die 110B. In this embodiment, a plurality of upper forming recesses 111B is formed in the bottom surface of the upper forming die 110B.

The lower forming tool 120B is mounted to the lower press die 20 so as to be capable of being raised and lowered. In this embodiment, the lower forming tool 120B includes a lower tool base 121B, which is provided to be capable of being raised and lowered, and lower press portions 122B, which are provided at the lower tool base 121B. Each of the lower press portions 122B has a distal end (an upper end) that has a shape corresponding to the shape of a respective one of the upper forming recesses 111B.

In this embodiment, each of the lower forming recesses 111A and the upper forming recesses 111B has a triangular shape. However, the shape of each of the lower forming recesses 111A and the upper forming recesses 111B is not limited thereto. For example, each of the lower forming recesses 111A and the upper forming recesses 111B may be formed in various other shapes, such as a semi-circular shape, a semi-elliptical shape, etc. It is more desirable to determine the shapes of the lower forming recesses and the upper forming recesses so as to minimize the contact area between the lower protrusions of a lower layer and the upper protrusions of an upper layer disposed on the lower layer.

In this embodiment, the lower forming die 110A and the upper forming die 110B are respectively provided at the lower press die 20 and the upper press die 10 so as to be spaced apart from each other by a predetermined distance in the transfer direction of the material S. In the same manner, the upper forming tool 120A and the lower forming tool 120B are respectively provided at the upper press die 10 and the lower press die 20 so as to be spaced apart from each other by a predetermined distance in the transfer direction of the material S.

In more detail, the upper forming tool 120A and the lower forming tool 120B are respectively mounted in tool-receiving portions 10a and 20a, which are respectively formed in the upper press die 10 and the lower press die 20, so as to be capable of being raised and lowered. The tool-receiving portion 10a formed in the upper press die and the tool-receiving portion 20a formed in the lower press die are located at positions that are misaligned from each other.

In this embodiment, the first forming set 100A and the second forming set 100B are spaced apart from each other by a distance of 1 pitch (the transfer distance of the material for every blanking process). Therefore, the tool-receiving portion 10a formed in the upper press die is located further upstream than the tool-receiving portion 20a formed in the lower press die in the transfer direction of the material S by 1 pitch.

The top surface of the lower forming die 110A and the bottom surface of the upper forming die 110B have a planar symmetric relationship therebetween such that each is the mirror image of the other. The upper forming die 110B is located at a position shifted by 1 pitch from the position directly above the lower forming die 110A. Therefore, when the laminar members are laminated one on another, the lower protrusions P1 formed by the first forming set 100A and the upper protrusions P2 formed by the second forming set 100B may be aligned with each other, and may face each other.

The upper press die 10 may include a plurality of bodies 10b and 10c, which are divided in the transfer direction of the material S, or may include a single integral body. The lower press die 20 may include a plurality of bodies 20b and 20c, which are divided in the transfer direction of the material S, or may include a single integral body. The core manufacturing apparatus shown in FIG. 2 may have a structure that includes an integral-type upper press die and an integral-type lower press die.

In this embodiment, the upper press die 10 is provided with a pressing member, i.e. a pusher, to push the material S toward the lower press die 20. When the upper press die 10 descends, the top surface of the material S is pushed down by the pusher 12, and the material S is therefore pressed toward the lower press die 20.

The upper press die 10 includes an upper frame 11, which is provided above the lower press die 20 so as to be capable of being raised and lowered, and the pusher 12, which is provided under the upper frame 11. In this embodiment, the blanking punch 210 and the pusher 12 are provided at the upper press die 10, particularly at the upper frame 11.

In this embodiment, the pusher 12 is a compressing plate or a pressing plate, which functions as a stripper during a blanking process and a piercing process and which pushes the material S toward the lower press die 20 for a protrusion-forming process and a blanking process. That is, in this embodiment, the pusher is a pushing plate having a plate configuration.

Further, an elastic member 12a (for example, a coil spring) for elastically pressing the pusher 12 and an ascending/descending guide 12b for guiding ascent and descent of the pusher 12 are provided between the pusher 12 and the upper frame 11.

The lower press die 20 includes a base frame 21 (a bolster), which is a bottom portion of the lower press die 20, and lower dies 22 and 23, which are provided on the base frame.

In this embodiment, the lower forming die 110A and the lower forming tool 120B are mounted in the lower dies 22 and 23. The lower dies 22 and 23 may be divided into a die frame 22, which is a top portion of the lower press die, and a die holder 23, which is provided under the die frame 22.

The die holder 23 supports the die frame 22, and is disposed on the base frame so as to be supported by the base frame. However, the structure of the lower press die 20 is not limited thereto. The die holder 23 may be divided into a plurality of parts. In this embodiment, the blanking die 220, the lower forming die 110A and the lower forming tool 120B are mounted in the lower dies 22 and 23.

The upper forming tool 120A, particularly the upper press portions 122A, are supported by the upper frame 11 so as to press the top surface of the material S by penetrating the pusher 12. Further, the upper forming die 110B is supported by the upper frame 11 and penetrates the pusher 12 so as to support the top surface of the material S. To this end, the pusher 12 includes a tool hole 12d, through which the upper forming tool 120A passes, and a die hole 12e, through which the upper forming die 110B passes.

Each of the upper forming tool 120A and the lower forming tool 120B is raised and lowered by an elevating device 400, such as a cam mechanism or hydraulic/pneumatic cylinder, whereby the vertical positions of the upper forming tool 120A and the lower forming tool 120B are adjusted. That is, when the protrusions need to be formed, the upper forming tool 120A is lowered and is protruded downwards by the elevating device 400 and the lower forming tool 120B is raised and is protruded upwards by the elevating device 400.

In other words, in the state in which the upper forming tool 120A and the lower forming tool 120B are moved (protruded) toward the material S at a predetermined cycle by the elevating device 400, when the upper press die 10 is lowered, the top surface and the bottom surface of the material S may be respectively pressed downwards and upwards by the upper forming tool 120A and the lower forming tool 120B. In this embodiment, the elevating device 400 is provided in each of the tool-receiving portion 10a of the upper press die and the tool-receiving portion 20a of the lower press die, and is coupled to each of the upper forming tool 120A and the lower forming tool 120B.

Therefore, the upper forming tool 120A is lowered to the bottom dead center at a predetermined cycle by the elevating device 400, and the lower forming tool 120B is raised to the top dead center at a predetermined cycle by the elevating device 400. When the protrusion-forming process is completed, the upper forming tool 120A and the lower forming tool 120B are pulled back by the elevating device 400 and are prevented from coming into contact with the material S until a subsequent cycle.

In more detail, in the case in which the laminate core C has a 10-layer structure including 10 laminar members, the protrusion-forming process is executed once whenever the material S moves 10 pitches and, thereby, interlayer division of the laminate cores C into groups may be realized.

To this end, the elevating device 400 elevates the upper forming tool 120A and the lower forming tool 120B (lowers the upper forming tool and raises the lower forming tool) once whenever the material S moves 10 pitches. In the lamination structure of the laminar members shown in FIG. 2, the dotted line represents a portion in which interlayer adhesion is executed, and the solid line represents a portion in which interlayer division is executed by the protrusions P.

Of the two laminar members that are adjacent to each other at the portion represented by the solid line, the upper laminar member includes the lower protrusions P1 and the lower laminar member includes the upper protrusions P2.

Referring to FIG. 3, the elevating device 400 in accordance with this embodiment includes an elevating body 410, which supports each of the upper forming tool 120A and the lower forming tool 120B and is provided in each of the tool-receiving portion 10a of the upper press die and the tool-receiving portion 20a of the lower press die so as to be capable of being raised and lowered, and a lifter 420 for raising and lowering the elevating body 410.

In this embodiment, the elevating body 410 is fixed to each of the upper forming tool 120A and the lower forming tool 120B so that each of the upper forming tool 120A and the lower forming tool 120B moves integrally with the elevating body 410. The elevating body 410 is coupled with an elevating rod 430, which penetrates the lifter 420 in the vertical direction.

The elevating device 400 in accordance with this embodiment is configured as a cam mechanism, and is operated such that the elevating body 410 is raised and lowered by sliding movement of the lifter 420 in the lateral direction. In other words, the elevating body 410 and the elevating rod 430 ascend and descend in place, and the movement of the elevating body 410 in the vertical direction is realized by the movement of the lifter 420 in the lateral direction. However, the structure and operating mechanism of the elevating device are not limited to the above description.

Figure 5:
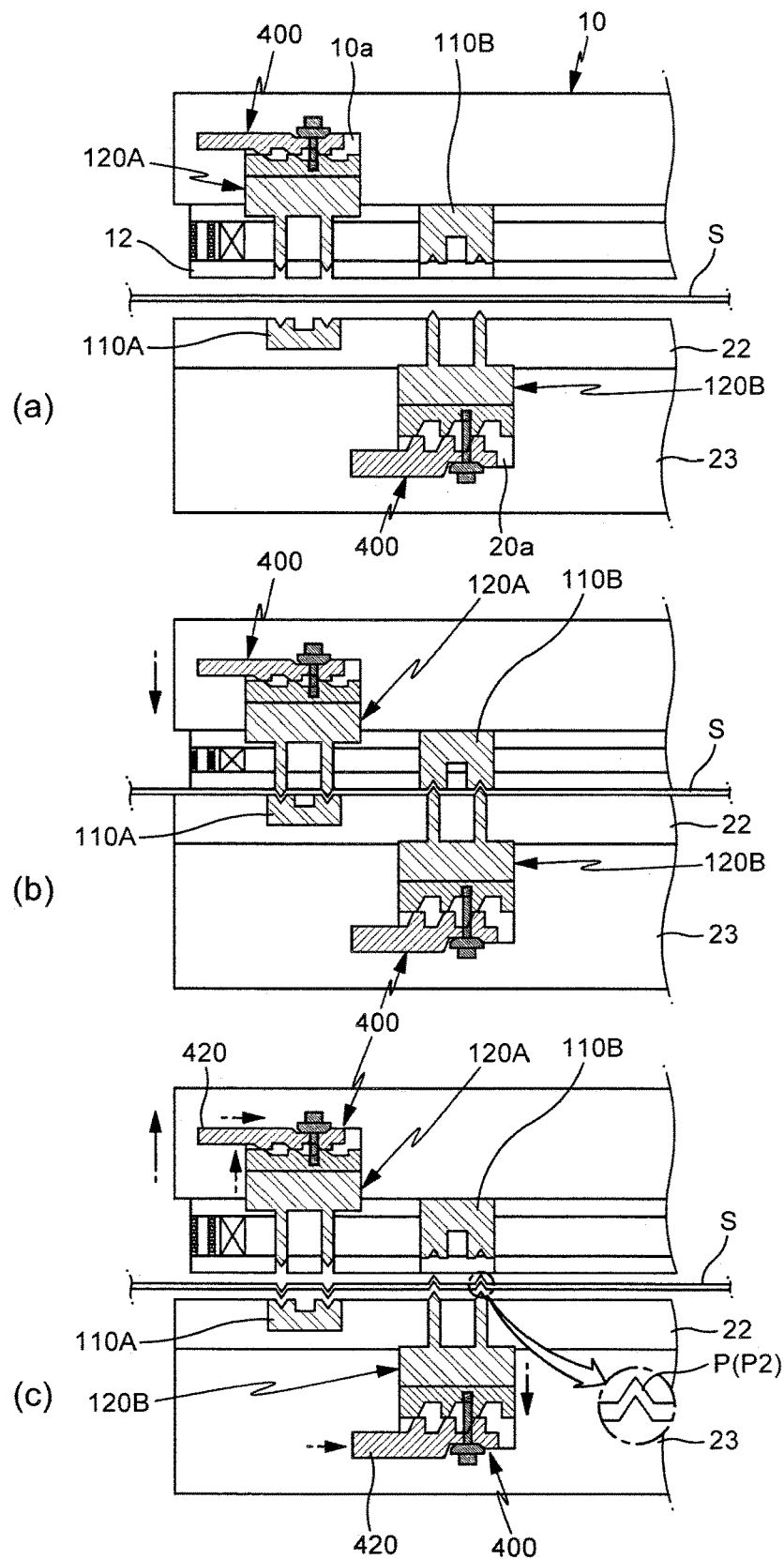
FIG. 5 is a view illustrating the process of forming protrusions for interlayer division on the material by the protrusion-forming unit shown in FIGS. 3 and 4.
Figure 6:
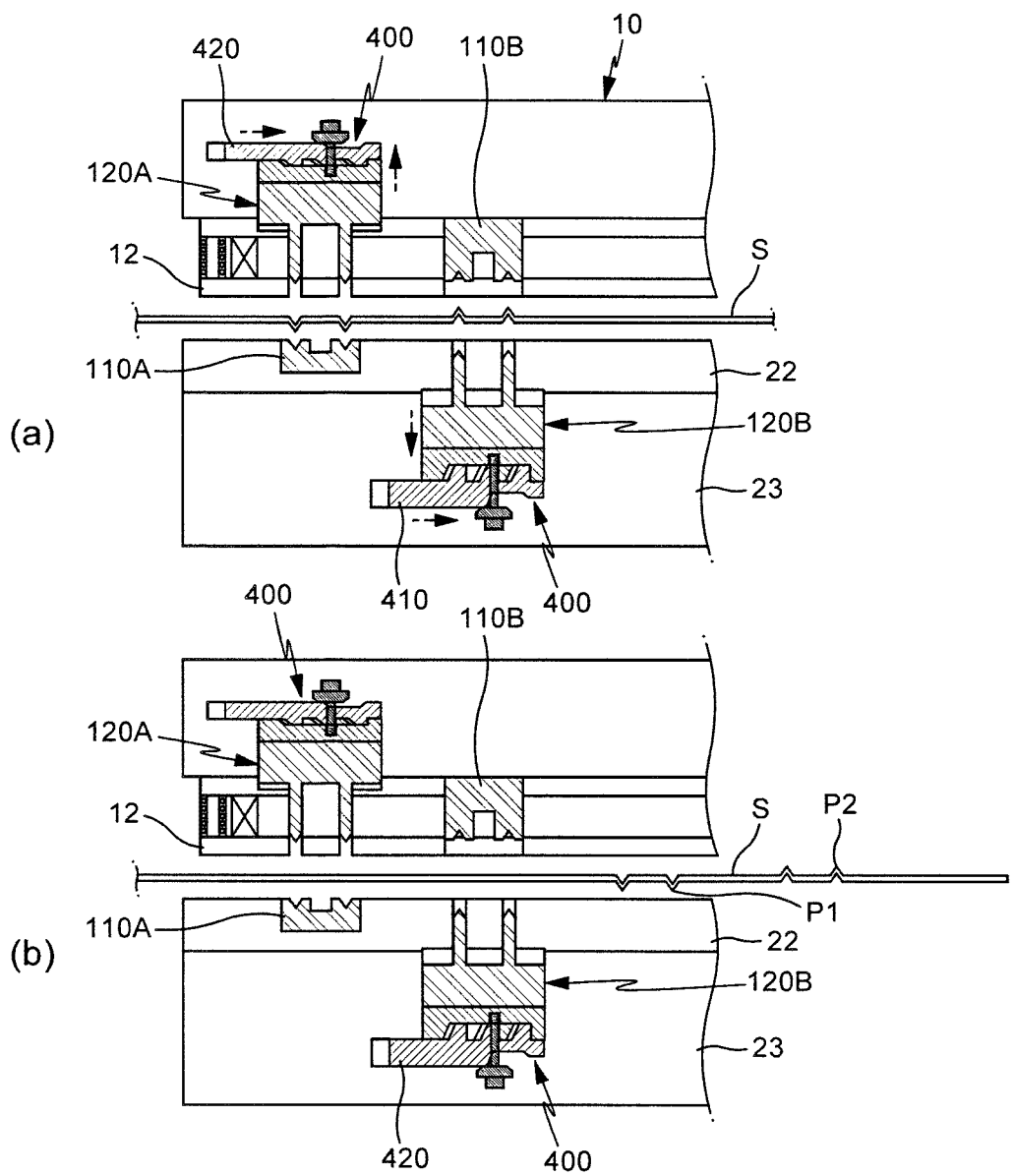
FIG. 6 is a view illustrating the state in which the protrusion-forming unit shown in FIGS. 3 and 4 is moved back.

Hereinafter, with reference to FIGS. 5 and 6, the operation of the protrusion-forming unit 100 in accordance with this embodiment will be described in more detail.

The material S moves a predetermined distance (1 pitch) at each cycle, i.e. per pressing stroke of the upper press die 10, and passes through the space between the pusher 12 and the die frame 22. As shown in FIG. 5(a), the upper forming tool 120A is lowered to the bottom dead center by the elevating device 400, and the lower forming tool 120B is raised to the top dead center by the elevating device 400 at the same time as or shortly before a predetermined portion of the material S reaches the protrusion-forming position.

As shown in FIG. 5(b), when the upper press die 20 descends, the top surface of the material S is pushed by the pusher 12, and the bottom surface of the material S comes into close contact with the lower press die 20. At this time, the upper forming tool 120A presses the top surface of the material S and thus forms the lower protrusions P1 in cooperation with the lower forming die 110A.

Simultaneously with the formation of the lower protrusions P1, the lower forming tool 120B presses the bottom surface of the material S and forms the upper protrusions P2 in cooperation with the upper forming die 110B. Thereby, the lower protrusions P1 and the upper protrusions P2 are respectively formed on the bottom surface and the top surface of the material S with an interval of 1 pitch therebetween. The blanking unit 200 performs a blanking process simultaneously with the protrusion-forming process.

FIG. 5(c) is a view illustrating the state in which the upper press die 10 ascends after the lower protrusions P1 and the upper protrusions P2 are formed on the bottom surface and the top surface of the material S. The upper forming tool 120A ascends and the lower forming tool 120B descends at the same time as or shortly after the ascent of the upper press die 10.

FIG. 6(a) is a view illustrating the state in which the upper forming tool 120A ascends and the lower forming tool 120B descends in order to prevent the upper forming tool 120A and the lower forming tool 120B from coming into contact with the material even when the upper press die 10 descends. As shown in FIG. 6(b), the protrusion-forming process is not performed during certain predetermined cycles.

Although the protrusion is illustrated as protruding high in FIGS. 1 to 6, the protruding height of the protrusion P is not limited to a specific value as long as interlayer division can be realized. After the laminate core C is discharged from the core manufacturing apparatus in accordance with this embodiment, the protrusions may be eliminated by pressing the laminate core C using a separate press. The blanking punch 210 includes escape recesses 211 formed in the surface (the bottom surface) thereof in order to prevent the protrusions P, particularly the upper protrusions P2, from being pressed.

Figure 8:
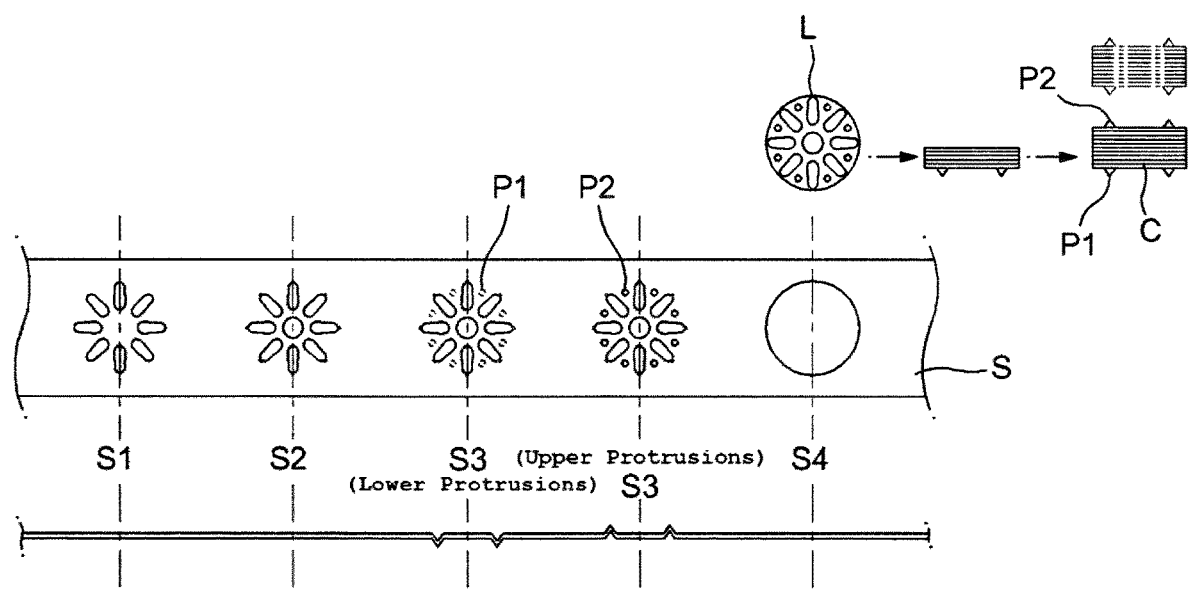
FIG. 8 is a view illustrating the process of manufacturing the exemplary laminate core shown in FIG. 7.
Figure 9:
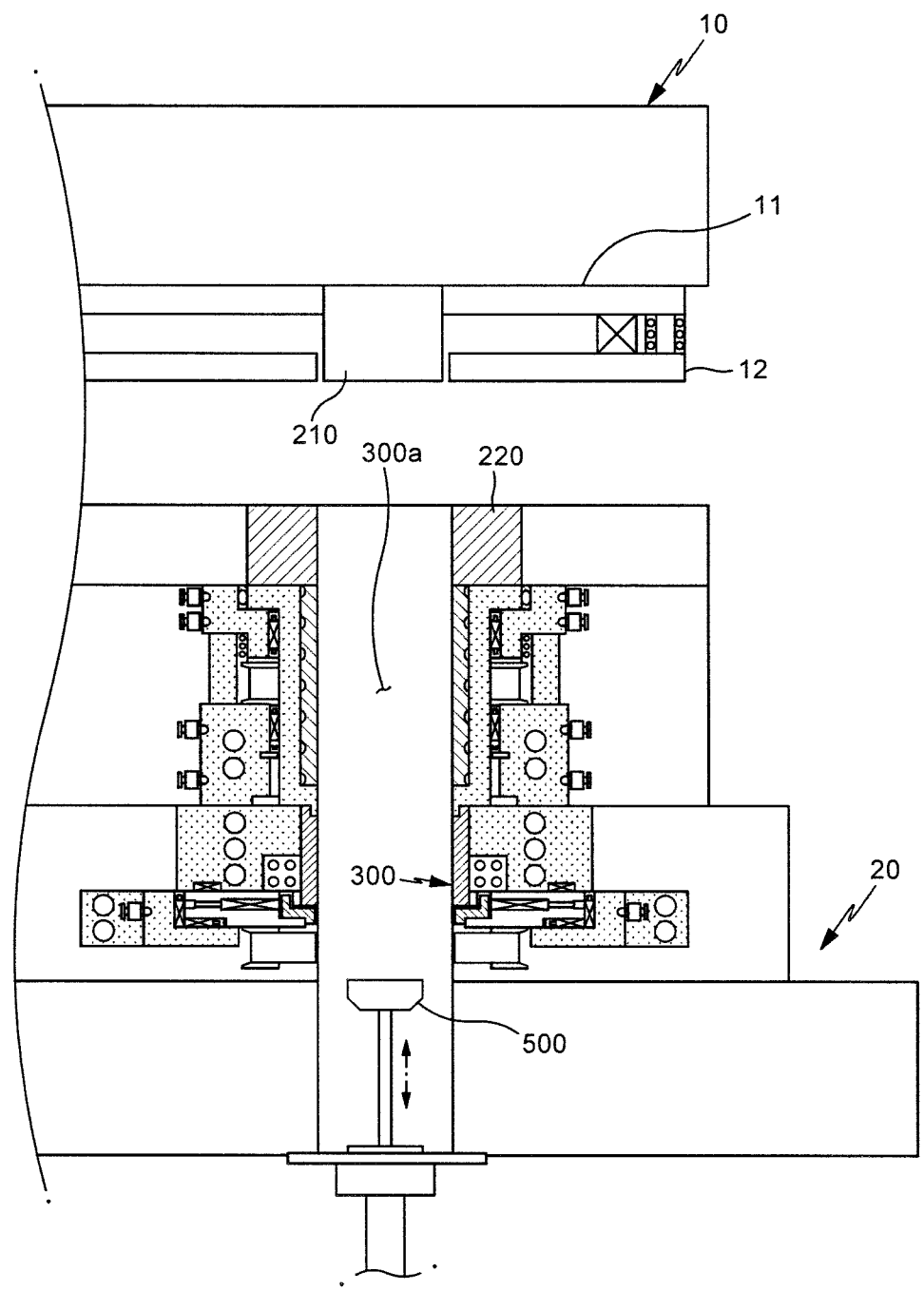
FIG. 9 is a longitudinal-sectional view illustrating a blanking unit and a laminating unit of the adhesive laminate core manufacturing apparatus shown in FIG. 1.

FIG. 7 is a perspective view illustrating an exemplary laminar member and an exemplary adhesive laminate core that can be manufactured by the embodiment of the present invention, and FIG. 8 is a process diagram illustrating an exemplary process of forming the laminar member shown in FIG. 7. In order to form the laminar member shown in FIG. 7, the material S sequentially undergoes piercing processes S1 and S2, a protrusion-forming process S3 and a blanking process S4 while being transferred. At this time, the protrusion-forming process is selectively performed at an interval equivalent to a predetermined multiple of a pitch. The procedure in which the laminar member L is formed is not limited to the above description.

Referring to FIGS. 9 to 13, the laminating unit 300 integrates the laminar members L, sequentially formed by blanking the material S and, more particularly, integrates the laminar members L in a predetermined number into one body by heating the adhesive interposed between the multi-layered laminar members L.

In more detail, the laminating unit 300 includes a heater 310, for heating the adhesive interposed between the laminar members L continuously passing through a laminating hole 300a, and pinchers 320 provided under the heater 310 so as to pinch the laminate core member C.

The laminating hole 300a is a space in which the laminar members L are laminated in the vertical direction and continuously move so as to be integrated, and in this embodiment, the laminating hole 300a is formed through the laminating unit 300 in the vertical direction.

The heater 310 is a device that heats the adhesive (the interlayer adhesive) interposed between the laminar members L so as to realize interlayer adhesion between the laminar members, and in this embodiment, the heater 310 is a high-frequency induction heater for rapidly realizing interlayer adhesion between the laminar members. High-frequency induction heating is well known in the art, and a detailed description thereof will thus be omitted. In the present invention, high-frequency induction heating is disclosed as a method of effectively heating the adhesive interposed between the laminar members and minimizing thermal influence on peripheral parts.

The heater 310 has therein a hardening hole, through which the laminar members pass and which forms a hardening space of the adhesive, and a lamination guide 330 for guiding movement of the laminar members L is provided in the hardening hole. The lamination guide 330 may be formed of a nonconductive material, in greater detail, of an engineering ceramic, so as not to be influenced by high-frequency induction heating.

The lamination guide 330 may have a vacant integral block structure, such as a ring type or a barrel type, or may have a split structure in which a plurality of parts is mounted so as to be spaced apart from each other within the heater. In consideration of thermal expansion of the objects to be heated (the laminar members) and the lamination guide 330, a gap may be formed between the inner circumferential surface of the hardening hole and the lamination guide 330.

The pinchers 320 prevent a product discharged downwards from the heater 310, i.e. the laminate core C formed by integrating the laminar members L, from falling rapidly. To this end, the pinchers 320 are provided under the heater 310, and provide lateral pressure to the laminate core C so as to prevent the laminate core C from falling rapidly.

Further, the laminating unit 300 further includes a squeezer 340 to apply pressure (lateral pressure) to the side surfaces of the laminar members L moving downwards toward the heater 310 from above the heater 310 so as to squeeze the laminar members L, i.e. a squeezer 340 for alignment.

The squeezer 340 applies lateral pressure to the laminar members L so that the laminar members L sequentially formed by blanking the material S are aligned so as to be laminated within the entrance of the laminating hole 300a, i.e. the space above the heater 310. As the laminar members L sequentially enter the squeezer 340, the laminar members L are interference-fitted into the squeezer 340. In other words, the squeezer 340 squeezes the circumferences of the laminar members L so that the laminar members introduced into the laminating hole 300a are coaxially aligned in a straight line within the entrance of the laminating hole.

In this embodiment, the squeezer 340 is located above the heater 310 and aligns the laminar members L in a straight line, and the laminar members L are laminated in the aligned state by the squeezer 340 and enter the high-frequency induction heater, i.e. the heater 310, via the squeezer 340. The squeezer 340 may be made of special steel, for example, SKD-11.

The squeezer 340 is disposed under the blanking die 220 and is aligned coaxially therewith. Although the outer diameter of the laminar member L is illustrated as being smaller than the inner diameter of the blanking die 220 in FIG. 11, it will be obvious to those skilled in the art that the two diameters are substantially the same as each other. The laminar member is formed to have a shape and a size equivalent to the shape and the size of the blanking die 220, particularly the shape and the size of the blanking hole, and the laminar members L pass through the laminating hole 300a from the top to the bottom thereof in the state in which the circumferences of the laminar members L are kept in close contact (interference-fitted) with the inner circumferential surface of the laminating hole 300a, particularly the inner circumferential surface of the squeezer.

The squeezer 340 supports the side surfaces (for example, the circumferences) of the laminar members L and prevents a lamination error, i.e. an alignment error, of the laminar members L so as to sequentially stack the laminar members, and may include a squeezer ring that has the same shape as the inner hole in the blanking die 220, i.e. the blanking hole.

For example, in the case of manufacturing the laminate core shown in FIG. 7, the squeezer 340 may be formed in the shape of a cylinder that is completely hollow in the vertical direction. However, the invention is not limited thereto.

As described above, the blanking unit 200 is a device that blanks the material, and the laminating unit 300 is a device that integrates the laminar members L sequentially formed through the blanking. The laminating hole 300a, in which the laminar members L sequentially laminated by the blanking unit 200 are integrated while passing therethrough, is provided under the blanking die 220 and is aligned coaxially therewith.

The pinchers 320 apply lateral pressure to a product passing through the space between the pinchers 320 and thus assist in alignment of the product C moving downwards through the heater 310 and prevent the product, i.e. the laminate core C, from falling rapidly.

Each of the pinchers 320 includes a pincher block 321 and a pincher spring 322, which is an elastic member for elastically supporting the pincher block 321. The pinchers 320 pinch the side surface of the laminate core C discharged from the heater 310 and prevent the laminate core C from falling rapidly to the bottom of the laminating hole 300a after passing through the heater 310.

Figure 13:
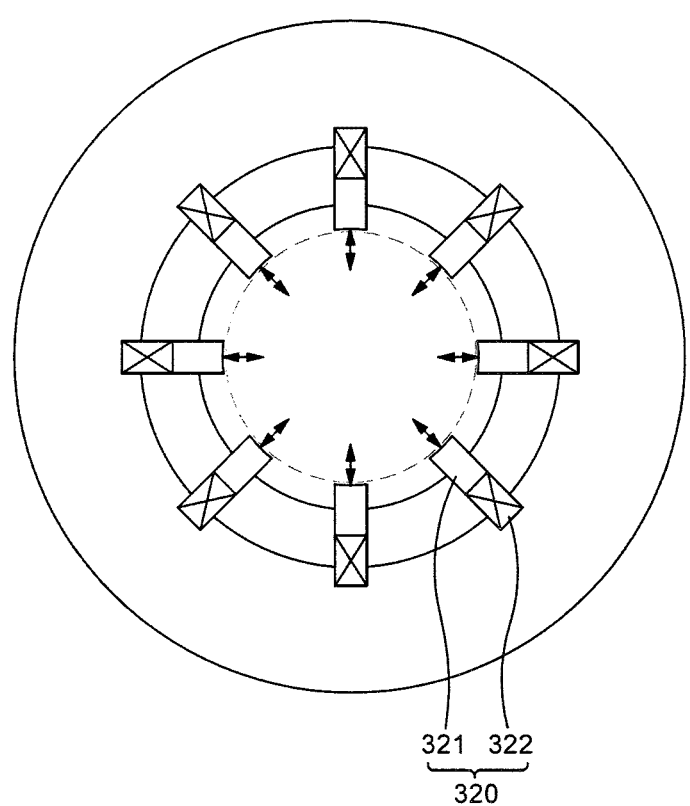
FIG. 13 is a plan view schematically illustrating one embodiment of a pincher that is applicable to the laminating unit shown in FIG. 9.

Referring to FIG. 13, a plurality of pincher blocks 321 is spaced apart from each other in a split manner along the circumference of the laminate core C within the laminating hole 300a, for example, is installed at predetermined angles within the laminating hole 300a. Although the pinchers 320 may be formed as a moving type or a fixed type, the pinchers 320 may be formed as a moving type in consideration of thermal expansion. If, in FIG. 13, the pincher springs 322 are omitted and the pincher blocks 321 are fixed in place, fixed-type pinchers may be formed.

The pincher blocks 321 are disposed at a plurality of positions spaced apart from each other along the circumference of the laminate core C and are elastically supported by elastic members, i.e. the pincher springs 322, thus applying elastic lateral pressure, i.e. pinching force, to the laminate core C.

The blanking die 220, the squeezer 340, the guide 330 and the pinchers 320 are disposed in the lower press die 10 in the vertical direction, and an extraction support 500 for supporting the bottom surface of a product (the laminate core C) discharged after undergoing the laminating and hardening processes is provided at the bottom of the laminating hole 300a so as to be capable of being raised and lowered.

The extraction support 500 descends in the state in which the laminate core C is seated thereon. When the extraction support 500 reaches the bottom of the laminating hole (laminating barrel), an extraction cylinder (not shown) pushes the laminate core C to a product extraction passage and thus assists in extraction of the product.

Figure 11:
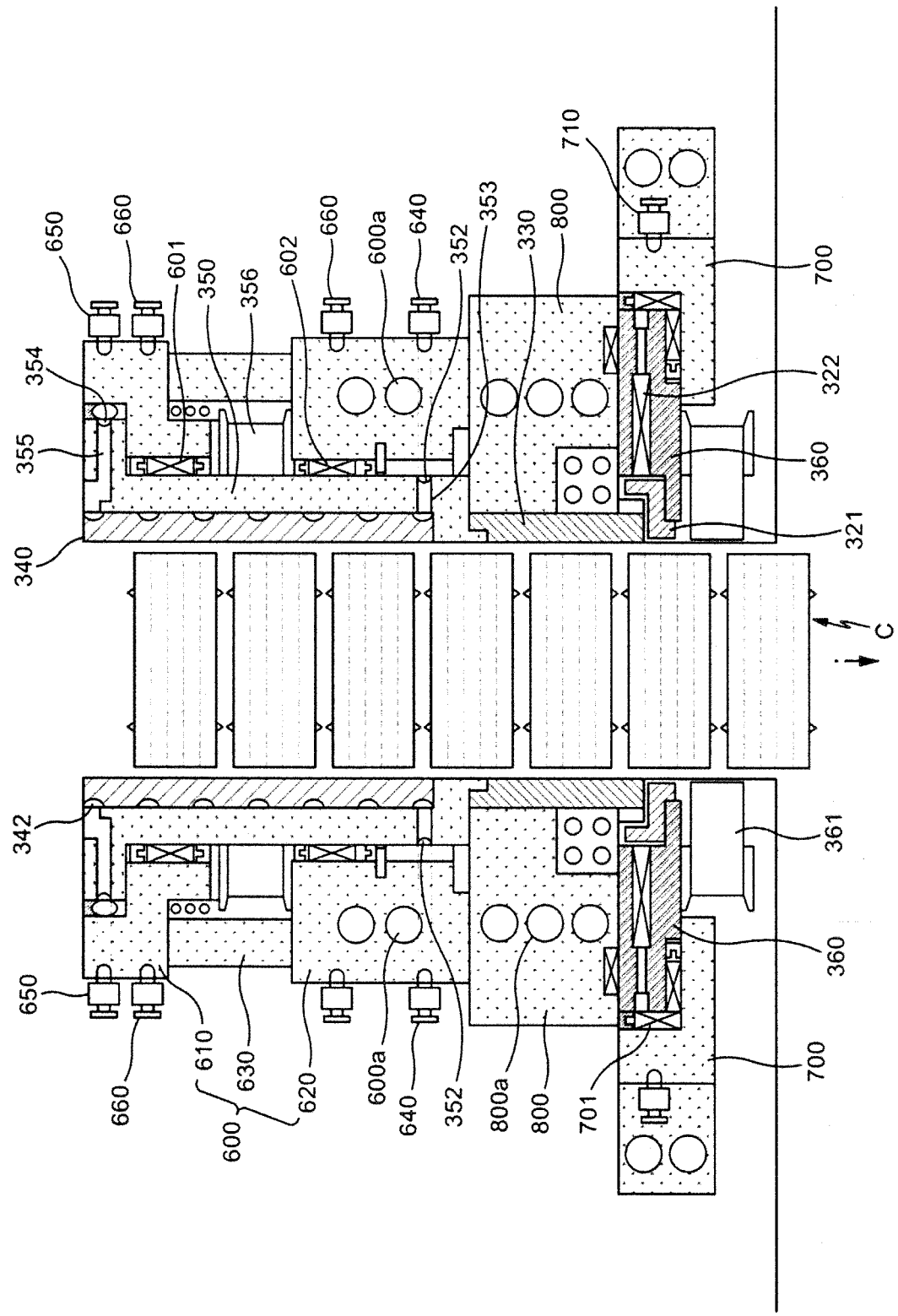
FIG. 11 is a cross-sectional view illustrating the process in which laminar members are integrated in the laminating unit (a laminating hole) shown in FIG. 10.

Although FIG. 11 illustrates an interval formed between the laminate cores C, the laminate cores C are actually stacked such that the lower protrusions of an upper laminate core and the upper protrusions of another laminate core disposed under the upper laminate core contact each other, and thus the laminate cores C continuously pass through the laminating hole 300a by 1 pitch (equivalent to the thickness of a single laminar member) per pressing stroke and are lowered while being seated on the extraction support 500.

High-temperature heat is generated from the laminating unit 300 by the heater 310. The lower press die 20, the blanking die 220 and the squeezer 340 may thermally expand due to the high-temperature heat generated by the heater 310, leading to variation in the shape or size of the laminar members L and consequent lamination error of the laminar members L.

This embodiment includes a cooling system for the laminating unit 300.

Figure 10:
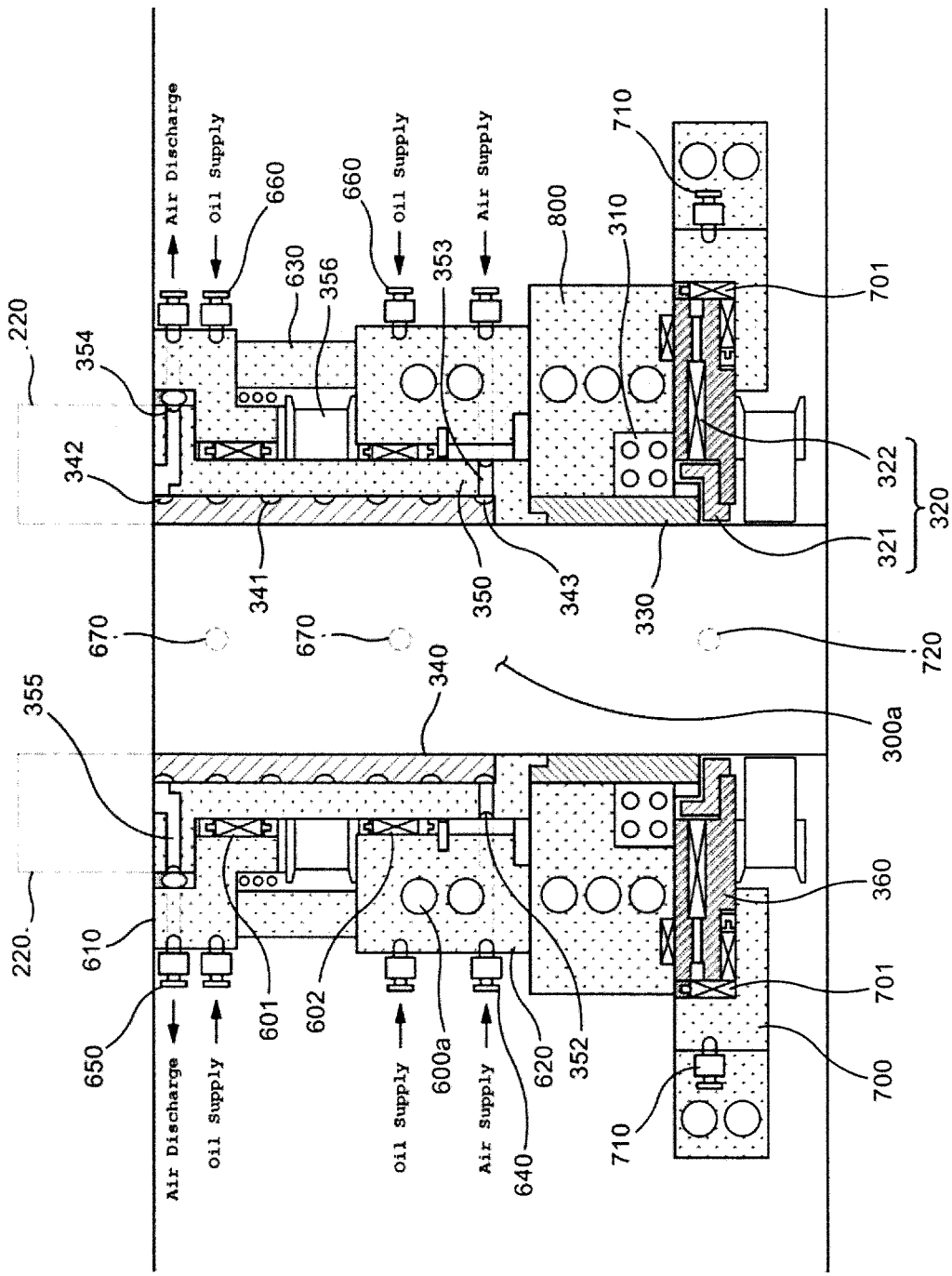
FIG. 10 is a cross-sectional view schematically illustrating the laminating unit shown in FIG. 9.

Referring to FIGS. 10 to 12, the squeezer 340 has a cooling groove 341 formed in the outer circumferential surface thereof. Cooling fluid flows through the cooling groove 341 and thus prevents overheating of the squeezer 340.

In this embodiment, the cooling groove 341 is formed in a spiral shape in the outer circumferential surface of the squeezer 340, and an annular-shaped upper groove 342 and an annular-shaped lower groove 343 are formed in the outer circumferential surface of the upper end portion and the outer circumferential surface of the lower end portion of the squeezer 340 so as to be respectively connected to the upper end and the lower end of the cooling groove 341 to form a closed loop. Air is used as the cooling fluid. However, the invention is not limited thereto, and, for example, liquid cooling fluid may be used.

The laminating unit 300, that is, the squeezer 340, the lamination guide 330 and the pinchers 320, is rotatably provided at the lower press die 20 in order to realize a uniform thickness of the laminate core. The laminating unit 300 is rotated at a predetermined angle, for example, 120°, at a predetermined timing, thus reducing variation in the thickness of the laminate core C and improving the perpendicularity and flatness of the laminate core C.

In this embodiment, the squeezer 340 is fixed in a rotation housing 350, and is rotatably supported by an upper fixing block 600, which is fixed to the lower press die 20. The upper fixing block 600 is installed in the lower press die 20 in a fixed manner, and the rotation housing 350 is rotatably provided in the upper fixing block 600.

The squeezer 340 is rotated with the rotation housing 350, and upper bearings 601 and 602 are provided in the upper fixing block 600 in order to rotatably support the rotation housing 350.

The upper fixing block 600 of this embodiment has a structure in which a plurality of bodies is assembled with each other in a stacked manner. However, the invention is not limited thereto. The rotation housing 350 has a hollow cylindrical shape. The rotation housing 350 includes an upper flange 351, which protrudes from the upper end of the rotation housing 350 in the outward direction of the rotation housing 350, and the lower end of the rotation housing 350 protrudes in the inward direction of the rotation housing 350.

In more detail, the upper flange 351 is in surface contact with the bottom surface of the blanking die 220, and the lower end of the rotation housing 350 surrounds the lower end of the squeezer 340. The squeezer 340 is press-fitted and fixed into the rotation housing 350.

The upper fixing block 600 includes an upper support body 610 for rotatably supporting the upper-half portion of the rotation housing 350, a lower support body 620 for rotatably supporting the lower-half portion of the rotation housing 350, and an intermediate support body 630 provided between the upper support body 610 and the lower support body 620 in order to support the weight of the upper support body 610.

In this embodiment, the upper fixing block 600 is provided at the die holder, the first upper bearing 601 is provided between the inner surface of the upper support body 610 and the outer surface of the upper portion of the rotation housing 350, and the second upper bearing 601 is provided between the inner surface of the lower support body 620 and the outer surface of the lower portion of the rotation housing 350.

A gap formed between the upper flange 351 and the upper support body 610 is sealed so as to prevent leakage of the cooling fluid (air in this embodiment) in the squeezer 340.

The upper fixing block 600 may be provided with a cooling path 600a. In this embodiment, the cooling path 600a is formed in the lower support body 620, and is of a water-cooling type that cools the upper fixing block 600 by circulating water. However, other kinds of cooling fluid, such as oil or air, may alternatively be used, and the cooling path may also be formed in the upper support body 610 and the intermediate support body 630.

The upper fixing block 600 is provided with an air supply unit 640 for supplying air for cooling to the cooling groove 341 formed in the squeezer and an air discharge unit 650 for discharging air for cooling from the cooling groove 341 formed in the squeezer.

In this embodiment, the air supply unit 640 is provided at the lower support body 620 and supplies air to the lower end of the cooling groove 341 formed in the outer circumferential surface of the squeezer 340. The air discharge unit 650 is provided at the upper support body 610 and discharges air from the cooling groove 341 formed in the squeezer 340.

In more detail, air for cooling, which is supplied to the lower groove 343 formed in the squeezer 340, flows spirally along the cooling groove 341 to the upper groove 342 formed in the squeezer 340, and thus exchanges heat with the squeezer 340.

An air intake groove 352 is formed in the outer circumferential surface of the lower portion of the rotation housing 350 so as to form a closed loop in a circulating manner. The air intake groove 352 has therein an air supply hole 353, which penetrates the rotation housing 350 so that air is introduced into the rotation housing 350 therethrough. The air supply hole 353 communicates with the lower end portion of the cooling groove 341, particularly with the lower groove 343.

An air discharge groove 354 is formed in the outer circumferential surface of the upper portion of the rotation housing 350, particularly in the outer circumferential surface of the upper flange 351, so as to form a closed loop in a circulating manner along the circumference of the rotation housing 350. The air discharge groove 354 has therein an air discharge hole 355, which penetrates the rotation housing 350. The air discharge hole 355 communicates with the upper end portion of the cooling groove 341, particularly with the upper groove 342.

According to this embodiment, the inner opening of the air supply hole 353 communicates with the lower groove 343 formed in the squeezer, and the inner opening of the air discharge hole 355 communicates with the upper groove 342 formed in the squeezer.

In this embodiment, the air intake groove 352 is formed horizontally at the same height as the lower groove 343, the air discharge groove 354 is formed horizontally at the same height as the upper groove 342, and the air supply hole 353 and the air discharge hole 355 horizontally penetrate the rotation housing 350.

As described above, since the annular-shaped air intake groove 352 and the annular-shaped air discharge groove 354, each of which forms a closed loop, are respectively formed in the outer circumferential surface of the lower portion of the rotation housing 350 and the outer circumferential surface of the upper portion thereof, even when the rotation housing 350 rotates, the air supply unit 640 and the air discharge unit 650 can be connected to the air intake groove 352 and the air discharge groove 354 at all times, thus stably realizing the supply and discharge of air.

In this embodiment, the lower support body 620 has therein an air supply hole, which penetrates the lower support body 620 in order to guide air from the air supply unit 640 to the air intake groove 352, and the upper support body 610 has therein an air discharge hole, which penetrates the upper support body 610 in order to discharge air from the air discharge groove 354 to the outside.

In order to allow air for cooling, which is discharged from the outer circumferential surface of the upper portion of the squeezer 340 to the outside through the air discharge hole 355, to directly contact the blanking die 220 and exchange heat therewith, the air discharge hole 355 is connected to an exposed flow path, which is covered with the bottom surface of the blanking die 220. That is, while being discharged, air for cooling comes into contact with the blanking die 220 and exchanges heat therewith.

In this embodiment, the blanking die 220 is rotated integrally with the squeezer 340 and the rotation housing 350. More particularly, the blanking die 220 is fixed to the upper end of the rotation housing 350 using a fastening member (not shown) such as a bolt, and is rotated with the rotation housing 350.

Further, the upper fixing block 600 is provided with an oil supply unit 660 for supplying oil for lubricating and/or cooling the upper bearings 601 and 602 to the upper bearings 601 and 602 and an oil discharge unit 670 for discharging oil from the upper bearings 601 and 602. Thereby, it is possible to prevent damage to the upper bearings 601 and 602, which rotatably support the rotation housing 350, to prolong the lifespan of the upper bearings 601 and 602, and to cool the upper fixing block 600.

The pinchers 320 are provided in a pincher housing 360, which is configured to be rotatable, so as to be rotated with the pincher housing 360. The pincher housing 360 is rotatably supported by a lower fixing block 700, which is fixed to the lower press die 20. The lower fixing block 700 is installed in the lower press die 20 in a fixed manner, and the pincher housing 360 is rotatably provided in the lower fixing block 700.

In order to rotate the pincher housing 360, a lower bearing 701 is provided in the lower fixing block 700 in order to rotatably support the pincher housing 360. The lower fixing block 700 of this embodiment includes a single integral body that is formed in the shape of a hollow ring that includes a side wall having an L-shaped cross-section. However, the invention is not limited thereto.

The lower fixing block 700 is provided with oil systems 710 and 720 for supplying (710) or discharging (720) oil for lubrication and/or cooling to or from the lower bearing 701 provided in the lower fixing block. The oil systems 710 and 720 provided at the lower fixing block 700 may also function to cool the lower fixing block 700. The lower fixing block 700 may also be provided with a water-cooling-type cooling system or an air-cooling-type cooling system.

In addition, an intermediate fixing block 800, which contains the heater 310 therein, is provided between the upper fixing block 600 and the lower fixing block 700. The intermediate fixing block 800 may also be provided with a cooling path 800a.

In this embodiment, the cooling path 800a formed in the intermediate fixing block is of a water-cooling type that cools the upper fixing block 600 by circulating water. However, other kinds of cooling fluid, such as oil or air, may alternatively be used. The aforementioned lamination guide 330 is provided in the intermediate fixing block 800 so as to be driven by rotation of the rotation housing 350 and the pincher housing 360. Thereby, the lamination guide 330 is rotated simultaneously with the rotation housing 350 and the pincher housing 360.

The lower end of the rotation housing 350 may be in contact with the upper end of the lamination guide 330, and the pincher housing 360 may be in contact with the lower end of the lamination guide 330. The lamination guide 330 is driven by the rotation housing 350 and/or the pincher housing 360 so as to be rotated at the same speed as the rotation housing 350 and/or the pincher housing 360.

The rotation housing 350 and the pincher housing 360 are simultaneously rotated at the same angle as each other. In this embodiment, the rotation housing 350 and the pincher housing 360 are provided with pulleys.

Figure 14:
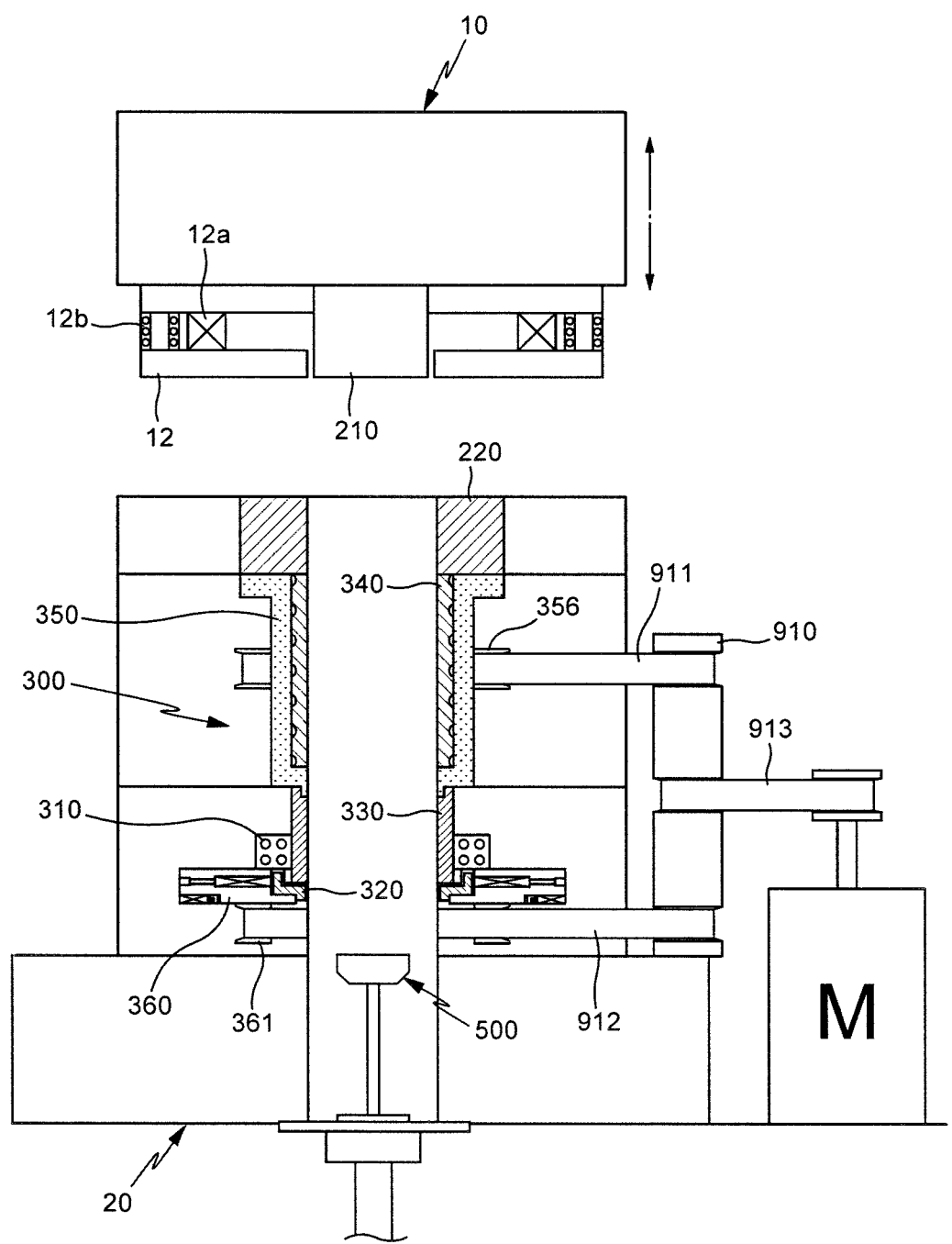
FIG. 14 is a view schematically illustrating a rotation mechanism of the laminating unit shown in FIG. 10.

Referring to FIG. 14, given that the pulley 356 of the rotation housing 350 is an upper pulley and that the pulley 361 of the pincher housing 360 is a lower pulley, the upper pulley 356 and the lower pulley 361 have the same outer diameter as each other and are connected to a single driving pulley 910 via a belt 911 and a belt 912, respectively, so that the rotation housing 350 and the pincher housing 360 rotate at the same angular speed as each other.

The driving pulley 910 is rotated by a motor M, and the motor M and the driving pulley 910 are connected to each other via a driving belt 913, i.e. a belt-pulley power transmission mechanism. However, the power transmission method is not limited thereto.

The core manufacturing apparatus in accordance with the embodiment of the present invention is an apparatus that is capable of manufacturing a laminate core using a strip-type material including an adhesive layer applied on the surface thereof. For example, the core manufacturing apparatus in accordance with the embodiment of the present invention is an apparatus that is capable of manufacturing a laminate core using a steel strap (a self-bonding steel strap; an SB steel strap), on which an adhesive layer has been formed in a semi-cured state at a predetermined temperature or less. The core manufacturing apparatus manufactures a laminate core by sequentially forming laminar members by blanking the material, forming protrusions for interlayer division on the surface of the material at a predetermined interval by being interlocked with the blanking process, heating and melting adhesive layers present between the laminar members laminated in multiple layers, and hardening the adhesive layers.

The present invention may provide an adhesive laminate core manufacturing method that includes the steps of forming protrusions for interlayer division on a material having an adhesive layer, blanking the material, and laminating and integrating laminar members.

While the exemplary embodiments according to the present invention have been described above, it will be obvious to those skilled in the art that in addition to the aforementioned exemplary embodiments, the present invention may be implemented as other specific forms without departing from the spirit and the scope of the present invention.

Accordingly, the aforementioned exemplary embodiment should be construed as illustrative and not restrictive, and thus, the present invention is not limited to the above description, but may be modified within the scope of the accompanying claims and equivalents thereof.

MODE FOR INVENTION

Hereinafter, an adhesive laminate core manufacturing apparatus in accordance with another embodiment of the present invention will be described with reference to FIGS. 15 to 18.

Figure 15:
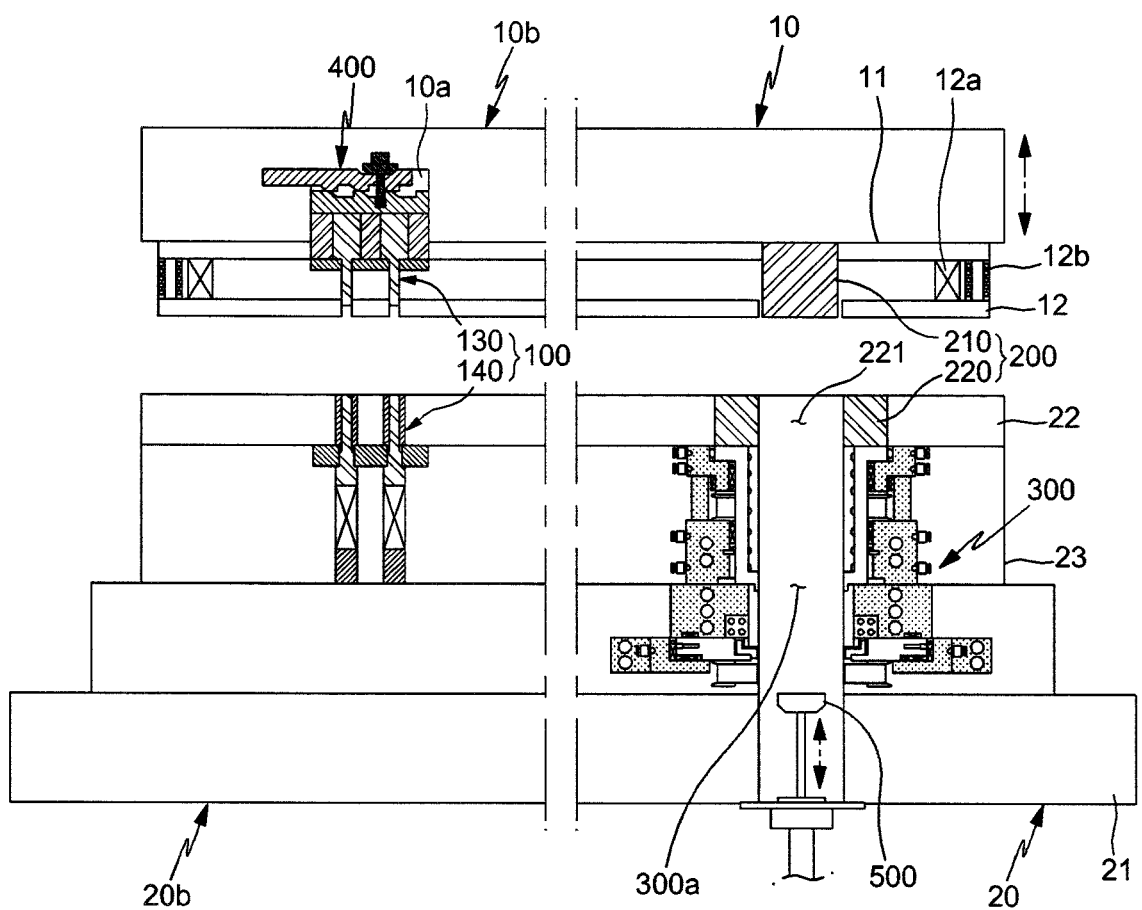
FIG. 15 is a longitudinal-sectional view schematically illustrating an adhesive laminate core manufacturing apparatus in accordance with another embodiment of the present invention, taken in the transfer direction of the material.
Figure 16:
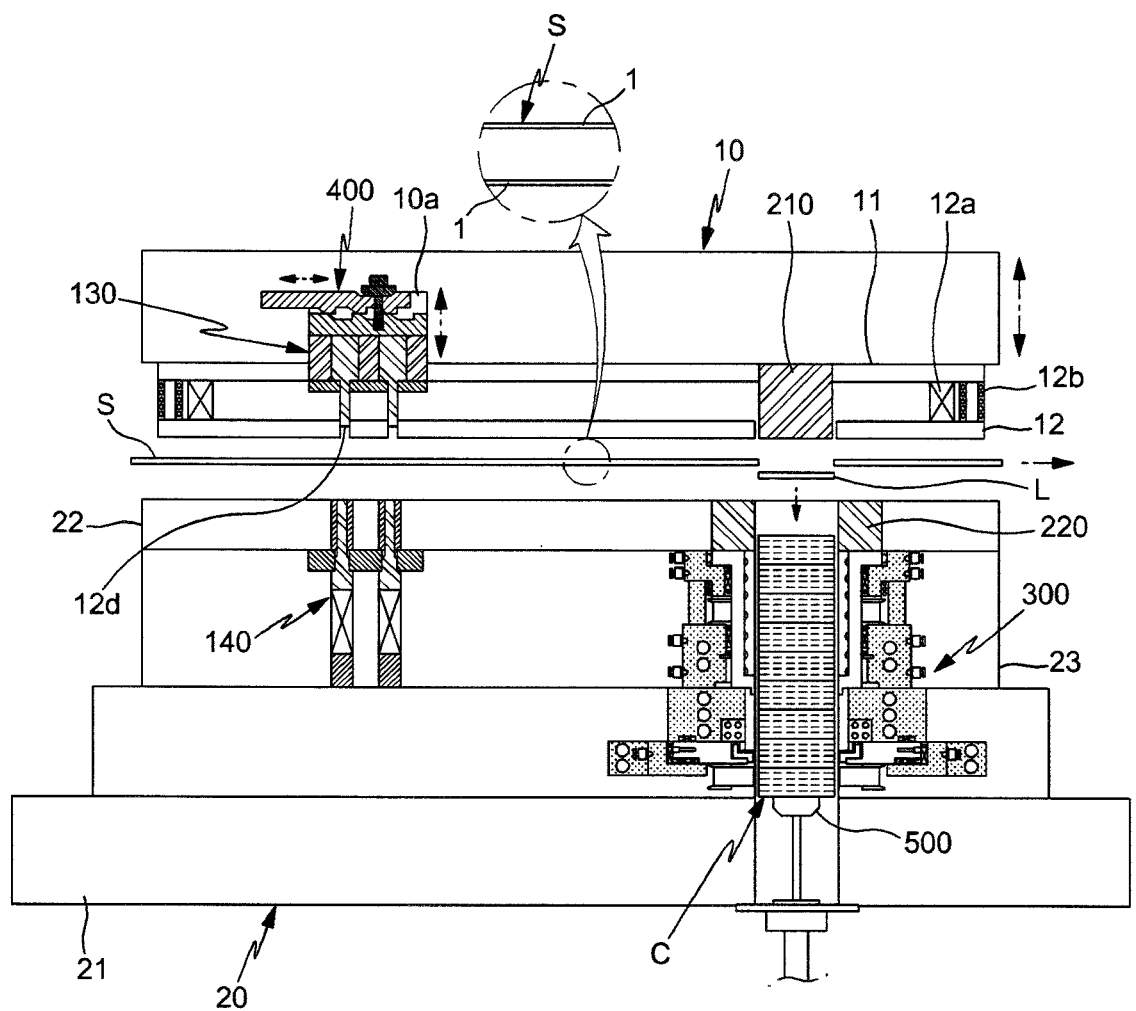
FIG. 16 is a view illustrating the state in which the material is supplied to an adhesive laminate core manufacturing apparatus in accordance with yet another embodiment of the present invention.
Figure 17:
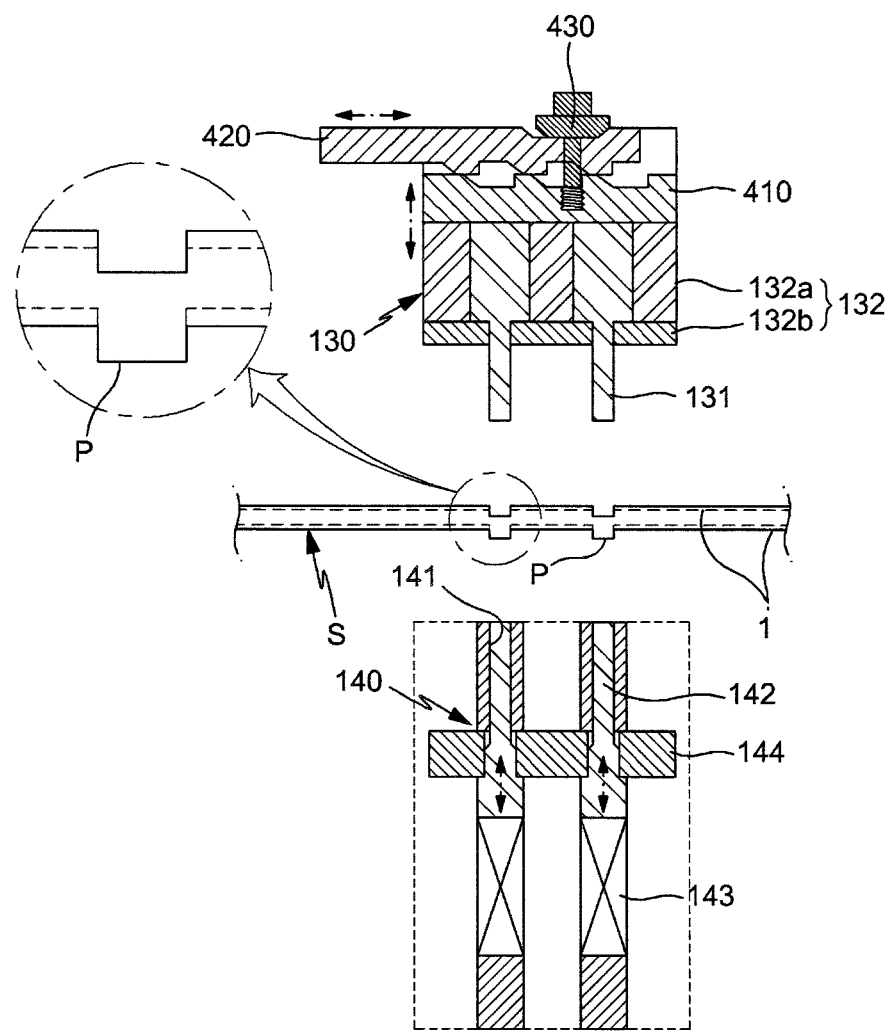
FIG. 17 is a view illustrating a protrusion-forming unit of the adhesive laminate core manufacturing apparatus shown in FIGS. 15 and 16.
Figure 18:
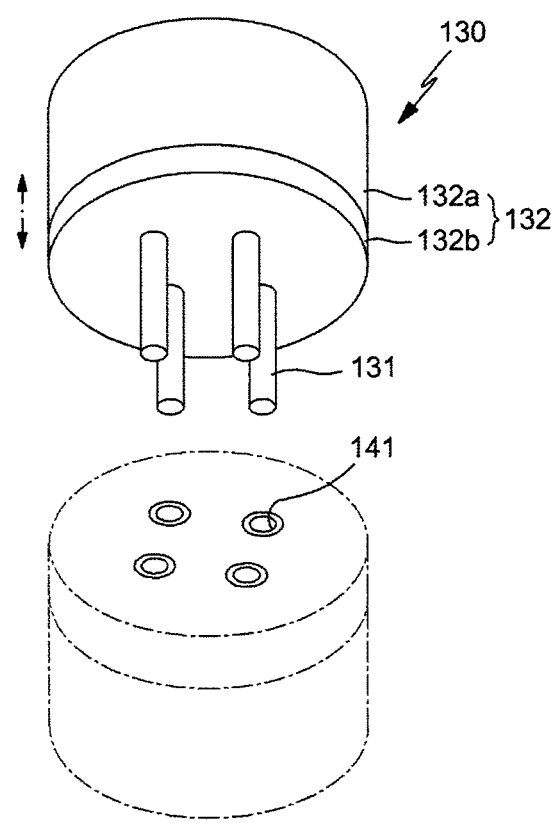
FIG. 18 is a perspective view schematically illustrating the protrusion-forming unit shown in FIG. 17.

In the drawings for explaining the embodiment of the present invention, FIG. 15 is a longitudinal-sectional view schematically illustrating an adhesive laminate core manufacturing apparatus in accordance with another embodiment of the present invention, taken in the transfer direction of the material, FIG. 16 is a view illustrating the state in which the material is supplied to an adhesive laminate core manufacturing apparatus in accordance with yet another embodiment of the present invention, FIG. 17 is a view illustrating a protrusion-forming unit of the adhesive laminate core manufacturing apparatus shown in FIGS. 15 and 16, and FIG. 18 is a perspective view of the protrusion-forming unit shown in FIG. 17.

Referring to FIGS. 15 to 18, the core manufacturing apparatus (the adhesive laminate core manufacturing apparatus) in accordance with this embodiment is an apparatus that sequentially manufactures laminate cores C by blanking a strip-type material S including an adhesive layer 1 applied on the surface thereof.

The core manufacturing apparatus in accordance with this embodiment includes a protrusion-forming unit 100 for dividing the laminate cores C into groups, a blanking unit 200 for sequentially forming the laminar members L through a blanking process, and a laminating unit 300 for forming the laminate core C by integrating the laminar members L in a predetermined number into one body.

When manufacturing the aforementioned laminate core C using the strip-type material S including the adhesive layer 1 applied on the surface thereof, the protrusion-forming unit 100 forms protrusions P, particularly protrusions for interlayer division, on the material S by pressing the material so as to divide the laminate cores C into groups. The protrusions P for interlayer division form a gap between two neighboring laminar members, which are laminated at the boundary between the laminate cores, thus reducing the contact area between the laminar members and preventing adhesion therebetween.

The blanking unit 200 and the laminating unit 300 are the same as those of the embodiment (the first embodiment) described in the Best Mode section and are thus denoted by the same reference numerals, and thus a duplicate explanation of the blanking unit 200 and the laminating unit 300 will be omitted in this embodiment.

The blanking unit 200 includes a blanking punch 210 and a blanking die 220 so as to form the laminar member by blanking the material. The laminating unit 300 is disposed further downstream than the protrusion-forming unit 100 in the transfer direction of the material S, and sequentially manufactures the laminate cores C.

In this embodiment, the protrusion-forming unit 100 forms the protrusions P for interlayer division on the surface of the material S at a predetermined cycle. For example, the protrusion-forming unit 100 is selectively synchronized with the blanking unit 200 so as to form the aforementioned protrusions P either on one surface or on the opposite surface of the material S in one direction at every predetermined number of iterations of blanking. The protrusion-forming process is executed at a predetermined timing before the blanking process.

The protrusion-forming unit 100 is synchronized with the blanking unit 200 whenever the material S is transferred by a predetermined multiple of a pitch so as to form the protrusions P on the material S. In the case in which the laminate core C has a 10-layer lamination structure including 10 laminar members, the protrusions P are formed in a regular pattern on the surface of the material S whenever the material is transferred by 10 pitches.

The blanking die 220 is provided at the lower press die 20 so as to be spaced apart from the protrusion-forming unit 100 by an N-pitch distance (N being a natural number equal to or greater than 1) in the transfer direction of the material S.

The protrusion-forming unit 100 includes a protrusion-forming tool 130, which forms the protrusions P for interlayer division by pressing one surface of the material so that the protrusions P protrude from the opposite surface of the material, and a forming die 140, which is disposed so as to face the protrusion-forming tool 130. In order to form the protrusions P for interlayer division on the material S, the protrusion-forming tool 130 presses the material at a predetermined cycle by being synchronized with the blanking unit 200.

Referring to FIG. 15, the protrusion-forming tool 130 is provided at any one of an upper support body 10b and a lower support body 20b, which are disposed so as to face each other, and the forming die 140 is provided at the remaining one thereof. The material S passes through the space between the upper support body 10b and the lower support body 20b by 1 pitch at each cycle.

In this embodiment, the protrusion-forming tool 130 is provided at the upper support body 10b, and the forming die 140 is provided at the lower support body 20b. However, this arrangement may be reversed.

In other words, in this embodiment, the protrusion-forming tool 130 is provided at the upper support body 10b in order to press one surface, i.e. the top surface, of the material S downwards, and the forming die 140 is provided at the lower support body 20b in order to support the opposite surface, i.e. the top surface, of the material S. More particularly, the protrusion-forming tool 130 presses one surface (the top surface) of the material downwards at a predetermined cycle by being synchronized with the blanking unit 200. The forming die 140 locally supports the surface that is opposite the portion pressed by the protrusion-forming tool 130.

Therefore, according to this embodiment, the protrusions P for interlayer division protrude downwards from the lower surface (the bottom surface) of the material S. The protrusion-forming unit 100 of this embodiment may be referred to as an embossing apparatus that locally presses one surface of a material so that protrusions protrude from the opposite surface of the material.

The upper support body 10*b* may have a structure that is provided separately from the upper press die 10, i.e. a structure that is spaced apart from the upper press die 10 in the upstream direction, or may be formed integrally with the upper press die 10, like the embodiment shown in FIG. 16. For example, the upper support body 10*b* may serve as a part of the upper press die 10 and may therefore move (ascend and descend) integrally with the upper press die 10.

The lower support body 20*b* may also have a structure that is provided separately from the lower press die 20 so as to be spaced apart therefrom, or may be formed integrally with the lower press die 20, like the embodiment shown in FIG. 16.

The material S used in this embodiment may be the same as the material described in the Best Mode section. In the case in which the protrusions P for interlayer division are periodically formed on only one of the top surface and the bottom surface of the material S in one direction, the contact area between the laminar member, which is in contact (for example, surface contact or point contact) with the protrusions for interlayer division, and the laminar member, on which the protrusions for interlayer division are formed, is reduced, thus facilitating interlayer division and integration of a predetermined number of laminar members into one body.

As described above, in the case in which the protrusion-forming tool 130 is provided at the upper support body 10*b* so as to press the top surface of the material S downwards and in which the upper support body 10*b* is formed integrally with the upper press die 10, that is, as shown in FIG. 16, in the case in which the upper support body 10*b* is a part of the upper press die 10, both the protrusion-forming tool 130 and the blanking punch 210 are provided at the upper press die 10.

In the case in which the forming die 140 is provided at the lower support body 20*b* and in which the lower support body 20*b* is formed integrally with the lower press die 20, that is, as shown in FIG. 16, in the case in which the lower support body 20*b* is a part of the lower press die 20, both the forming die 140 and the blanking die 220 are provided at the lower press die 20.

The protrusion-forming tool 130 is located directly above the forming die 140 so as to face the forming die 140. In this embodiment, the protrusion-forming tool 130 is installed to the upper press die 10 so as to ascend and descend integrally with the upper press die 10.

The forming die 140 has therein a protrusion-forming recess 141, which is formed in the top surface of the forming die 140, and the protrusion-forming tool 130 has a pressing protrusion 131, which faces the protrusion-forming recess 141.

In this embodiment, the pressing protrusion 131 has a flat distal end surface and a distal end portion having a uniform thickness. The pressing protrusion forms the protrusion P for interlayer division by pressing the surface of the material in one direction (in the downward direction in this embodiment). The protrusion-forming recess 141 has a shape corresponding to the shape of the distal end portion (the lower end portion) of the pressing protrusion 131, and is formed at a position facing the pressing protrusion 131.

Therefore, in this embodiment, the pressing protrusion 131 is oriented downwards so as to press the top surface of the material downwards, and the forming die 140 is disposed under the protrusion-forming tool 130 so as to locally support the bottom surface of the material. More particularly, the forming die 140 includes a plurality of protrusion-forming recesses 141, and the protrusion-forming tool 130 includes a plurality of pressing protrusions 131.

The protrusion-forming tool 130 is provided at the upper support body 10*b* so as to be capable of being raised and lowered. As described above, in the case in which the upper support body 10*b* is formed integrally with the upper press die 10, the protrusion-forming tool 130 is provided at the upper press die 10 so as to be capable of being raised and lowered. The protrusion-forming tool 130 is installed to the upper press die 10 so as to ascend and descend independently of the upper press die 10.

To this end, the upper press die 10 is provided with a tool-receiving portion 10*a*, and the protrusion-forming tool 130 is provided in the tool-receiving portion 10*a* so as to be capable of being raised and lowered. In this embodiment, the pressing protrusions 131 are provided at a tool base 132, which is provided to be capable of being raised and lowered. In other words, the tool base 132 is installed in the tool-receiving portion 10*a* so as to be capable of being raised and lowered, and the distal end (the lower end) of the pressing protrusion 131 has a shape corresponding to the shape of the protrusion-forming recess 141.

In more detail, the tool base 132 includes a base body 132*a*, to which the proximal end portion of the pressing protrusion 131 is mounted, and a base cover 132*b*, which fixes the proximal end portion of the pressing protrusion 131 to the base body 132*a*. Although not illustrated, the base cover 132*b* may be fixed to the base body 132*a* using a fastening member such as a bolt.

The distal end portion (the lower end portion) of the pressing protrusion 131 may be formed in the shape of a polygonal prism having a triangular- or quadrangular-shaped cross-section, a cylinder, or an elliptical prism. The protrusion-forming recess 141 has the same shape as the distal end portion of the pressing protrusion 131. In this embodiment, the pressing protrusion 131 is formed in the shape of a prism in which the size and shape of the cross-section thereof perpendicular to the longitudinal axis are uniform over the entire length thereof. However, the invention is not limited thereto. For example, the pressing protrusion may be formed such that the distal end portion thereof, from the distal end surface (the lower end surface) to a portion distant from the distal end surface by a designated distance, has a uniform thickness and such that the thickness increases or decreases from the portion distant from the distal end surface by a designated distance to the proximal end portion thereof. The protrusions P for interlayer division reduce the contact area between the laminate cores C, which are adjacent to each other at the boundary at which the laminate cores are to be divided, and thus prevent adhesion between the laminate cores.

Further, the forming die 140 is provided with an ejector 142, e.g. an ejecting pin, to eject the protrusion P for interlayer division from the protrusion-forming recess 141. The ejector 142 is installed in the protrusion-forming recess 141 so as to be movable in the axial direction, and is elastically supported toward the entrance of the protrusion-forming recess 141. In this embodiment, the ejector 142 is elastically supported upwards.

In more detail, the ejector 142 is elastically supported by an elastic member 143 such as a spring, and is configured to be pushed downwards by the pressing force applied to the material S by the pressing protrusion 131 and enters the protrusion-forming recess 141. When the protrusion-forming tool 130 moves away from the forming die 140 due to the ascent of the upper press die 10, the ejector 142 is returned to the original position thereof by the elastic member 143, and pushes the protrusion P for interlayer division located inside the protrusion-forming recess 141 to the outside of the forming die 140.

In this embodiment, when no external force is applied to the ejector 142, the distal end (the upper end) of the ejector 142 is located at the same height at the surface (the top surface) of the forming die 140, particularly the top surface of the lower press die. In order to prevent the ejector 142 from being separated from the protrusion-forming recess 141, the base portion of the ejector 142 is formed in a stepped manner, and the forming die 140 includes a stopper 144 for restricting the movement range of the ejector.

Although FIG. 18 illustrates that four pressing protrusions 131 are arranged at positions biased from the center of the tool base 132 at equal angles, the number of pressing protrusions 131 is not limited to four, and the arrangement of the pressing protrusions 131 may vary depending on the shape of the laminar member L. The tool base 132 may not be formed in a circular shape, but may be formed in other shapes, such as a quadrangular shape.

As described above, the upper press die 10 may include a plurality of bodies, which are divided in the transfer direction of the material S, or may include a single integral body. The lower press die 20 may also include a plurality of bodies, which are divided in the transfer direction of the material S, or may include a single integral body. The core manufacturing apparatus shown in FIG. 16 has a press structure that includes an integral-type upper press die and an integral-type lower press die.

Like the first embodiment of the present invention, the upper press die 10 is provided with a pressing member, i.e. a pusher, to push the material S toward the lower press die 20. When the upper press die 10 descends, the top surface of the material S is pushed down by the pusher 12, and the material S is therefore pressed toward the lower press die 20.

The upper press die 10 and the lower press die 20 have the same structure as those of the above-described embodiment (the first embodiment). The pusher 12 is a compressing plate or a pressing plate, i.e. a pushing plate, which functions as a stripper during a protrusion-forming process, a blanking process and a piercing process and which pushes the material S toward the lower press die 20 for the protrusion-forming process and the blanking process.

The forming die 140 is supported by an upper frame 11 of the upper press die and penetrates the pusher 12 so as to support the top surface of the material S. To this end, the pusher 12 includes tool holes 12d, through which the distal end portions of the pressing protrusions 131 pass.

The protrusion-forming tool 130 is raised and lowered by an elevating device 400, such as a cam mechanism or hydraulic/pneumatic cylinder, whereby the vertical position of the protrusion-forming tool 130 at the upper press die 10 is adjusted. In this embodiment, when the protrusions need to be formed, the protrusion-forming tool 130 is lowered by the elevating device 400, and thus the distal end (the lower end) of the protrusion-forming tool 130 protrudes downwards.

In other words, in the state in which the protrusion-forming tool 130 is moved (protruded) toward the material S at a predetermined cycle by the elevating device 400, when the upper press die 10 descends, the top surface of the material S may be pressed downwards by the protrusion-forming tool 130. In this embodiment, the elevating device 400 is provided in the tool-receiving portion 10a of the upper press die, and is coupled to the protrusion-forming tool 130.

Therefore, in this embodiment, the protrusion-forming tool 130 is lowered to the bottom dead center at a predetermined cycle by the elevating device 400. After the protrusion-forming process is completed, the protrusion-forming tool 130 is moved back (raised) by the elevating device 400, and is therefore prevented from coming into contact with the material S until the subsequent cycle.

In more detail, in the case in which the laminate core C has a 10-layer structure including 10 laminar members, the protrusion-forming process is executed once whenever the material S moves 10 pitches, and, thereby, interlayer division of the laminate cores C into groups may be realized.

To this end, the elevating device 400 lowers the protrusion-forming tool 130 once within the upper press die 10 whenever the material S moves 10 pitches. In the lamination structure of the laminar members shown in FIG. 16, the dotted line represents a portion in which interlayer adhesion is executed, and the solid line represents a portion in which interlayer division is executed by the protrusions P.

Of the two laminar members that are adjacent to each other at the portion represented by the solid line (the boundary at which interlayer division is executed), the upper laminar member includes the protrusions P for interlayer division, which protrude downwards.

Referring to FIG. 17, in this embodiment, the elevating device 400 includes an elevating body 410, which supports the protrusion-forming tool 130 and is provided in the tool-receiving portion 10a of the upper press die so as to be capable of being raised and lowered, and a lifter 420 for raising and lowering the elevating body 410.

In this embodiment, the elevating body 410 is fixed to the protrusion-forming tool 130, particularly the base body 132a of the tool base, and the protrusion-forming tool 130 moves integrally with the elevating body 410. The elevating body may be fixed to the tool base using a fastening member such as a bolt. The elevating body 410 is coupled with an elevating rod 430, which penetrates the lifter 420 in the vertical direction.

The elevating device 400 used in this embodiment may be the same as the elevating device used in the above-described first embodiment.

Figure 19:
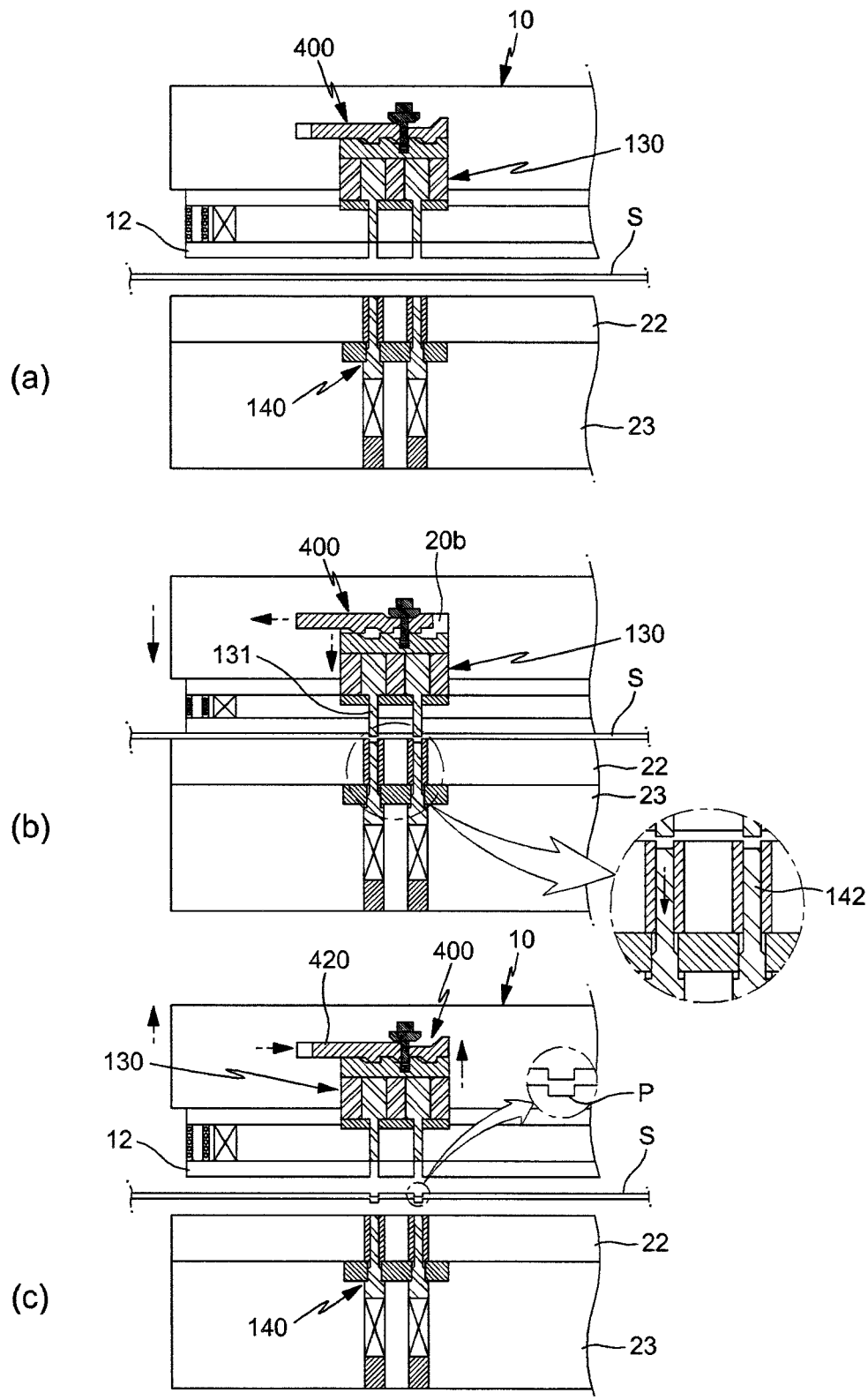
FIG. 19 is a view illustrating the process in which protrusions for interlayer division are formed on the material by the protrusion-forming unit shown in FIG. 17.

Hereinafter, the operation of the protrusion-forming unit 100 in accordance with this embodiment will be described in more detail with reference to FIGS. 19 and 20.

The material S moves a predetermined distance (1 pitch) at each cycle, i.e. per pressing stroke of the upper press die 10, and passes through the space between the pusher 12 and the die frame 22. As shown in FIG. 19(a) the protrusion-forming tool 130 is lowered to the bottom dead center by the elevating device 400 in the upper press die 10 at the same time as or shortly before a predetermined portion of the material S reaches the protrusion-forming position.

As shown in FIG. 19(b), when the upper press die 20 descends, the top surface of the material S is pushed by the pusher 12, and the bottom surface of the material S comes into close contact with the lower press die 20 and the forming die 140. At this time, the protrusion-forming tool 130 presses the top surface of the material S downwards and thus forms the protrusions P for interlayer division in cooperation with the forming die 140. At this time, the ejector 142 is pushed downwards to a predetermined depth within the protrusion-forming recess 141 by the pressing force applied thereto by the pressing protrusion 131, and elastically supports the protrusion P for interlayer division, which is formed within the protrusion-forming recess 141, in the outward direction of the protrusion-forming recess, i.e. in the upward direction. The blanking unit 200 performs a blanking process simultaneously with the protrusion-forming process.

FIG. 19(c) is a view illustrating the state in which the upper press die 10 ascends after the protrusion P is formed on the top surface of the material S. When the upper press die 10 ascends, the force of pressing the ejector 142 is eliminated. Therefore, the ejector 142 returns to the original position thereof while pushing the protrusion P for interlayer division, and, thereby, the material S may be easily separated from the forming die 140. The protrusion-forming tool 130 is raised to the top dead center by the elevating device 400 in the upper press die 10 at the same time as or shortly after the ascent of the upper press die 10.

FIG. 20(a) is a view illustrating the state in which the protrusion-forming tool 130 ascends in order to prevent the protrusion-forming tool 130 from coming into contact with the material even when the upper press die 10 descends and pushes the material S downwards. As shown in FIG. 20(b), the protrusion-forming process is not performed during certain predetermined cycles.

Figure 21:
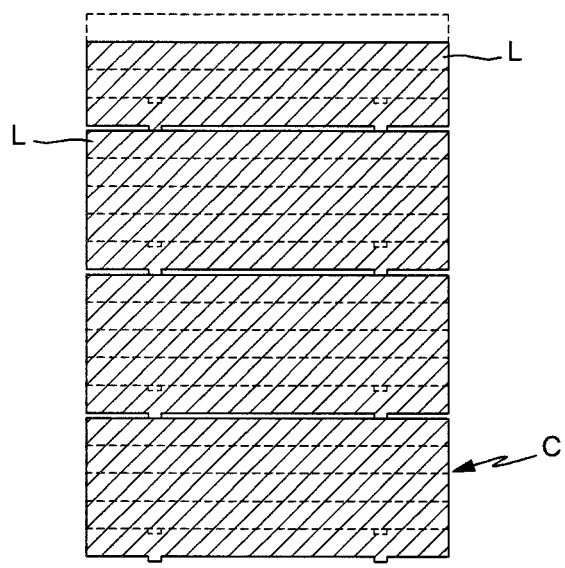
FIG. 21 is a view illustrating the laminated state of laminar members formed by the adhesive laminate core manufacturing apparatus shown in FIGS. 15 and 16.

FIG. 21 is a view illustrating the laminated state of the laminar members formed by the core manufacturing apparatus in accordance with this embodiment. The laminate cores C may be divided at the boundary between a laminar member including the protrusions for interlayer division, which protrude downwards, and another laminar member L disposed thereunder.

The protruding height of the protrusion P is not limited to a specific value as long as interlayer division can be realized. After the laminate core C is discharged from the core manufacturing apparatus in accordance with this embodiment, the protrusions may be eliminated by pressing the laminate core C using a separate press. Although the apparatus of this embodiment forms protrusions for interlayer division on the laminar member such that the protrusions protrude downwards, it may also be possible to realize division of the laminate cores using protrusions for interlayer division that protrude upwards. For example, it is possible to form protrusions for interlayer division on the material such that the protrusions protrude upwards by installing the protrusion-forming tool to the lower press die and installing the forming die to the upper press die.

Figure 22:
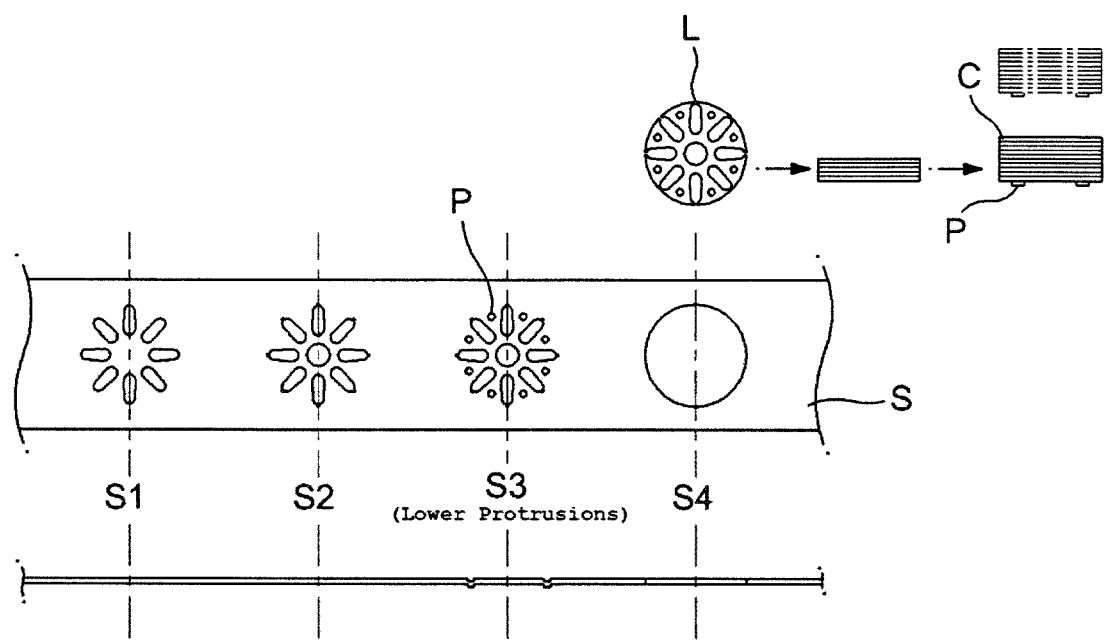
FIG. 22 is a view illustrating the process (procedure) of manufacturing the laminate core shown in FIG. 7 using the adhesive laminate core manufacturing apparatus shown in FIGS. 15 and 16.
Figure 23:
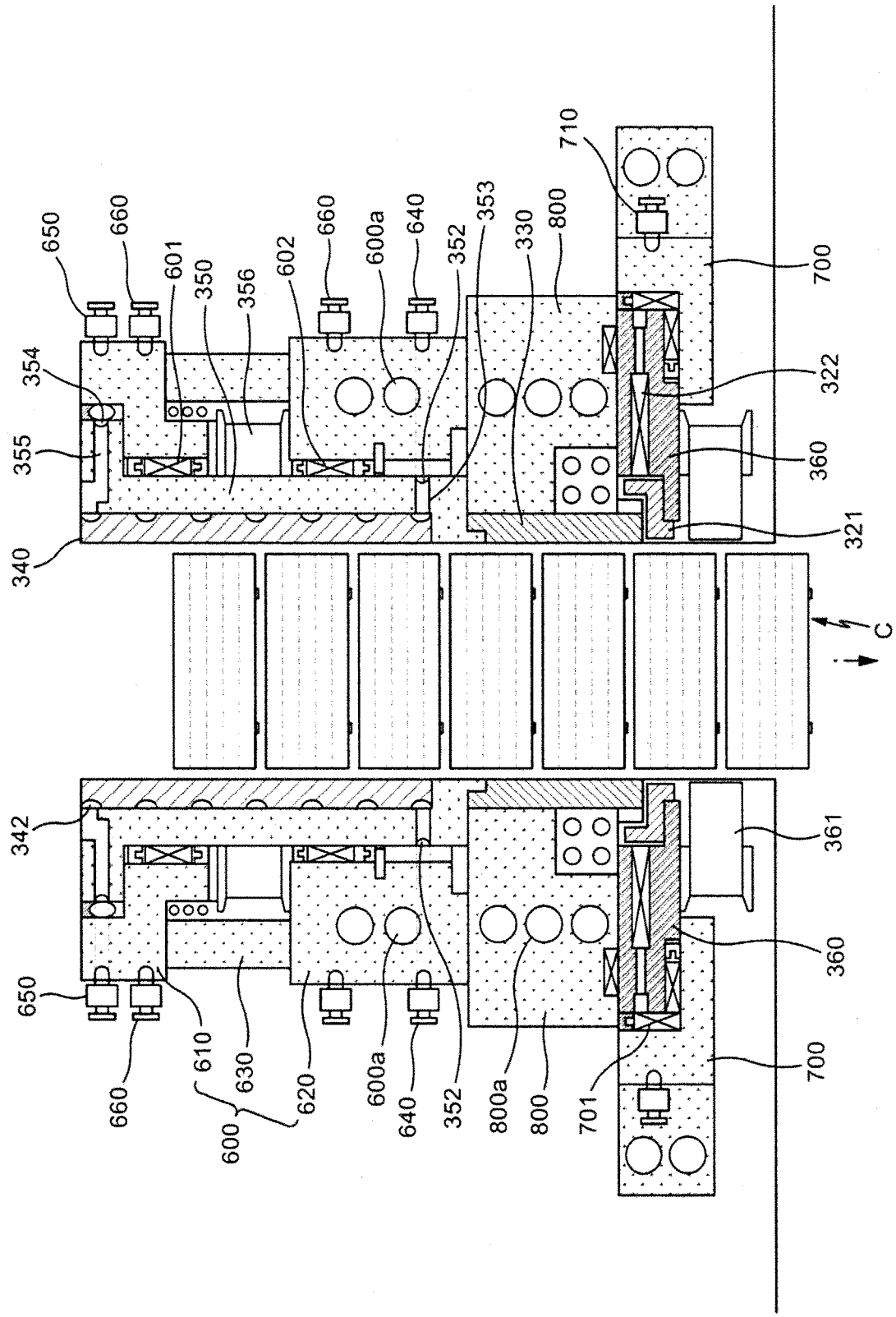
FIG. 23 is a cross-sectional view illustrating the process in which laminar members are integrated in the laminating unit (a laminating hole) shown in FIGS. 15 and 16.

FIG. 22 is a view illustrating the process of manufacturing the laminar member shown in FIG. 7 using the core manufacturing apparatus in accordance with this embodiment, and FIG. 23 is a cross-sectional view illustrating the state in which the laminar members are laminated in the laminating unit in the core manufacturing apparatus in accordance with this embodiment.

Referring to FIG. 22, in order to form the laminar member shown in FIG. 7, the material S sequentially undergoes piercing processes S1 and S2, a protrusion-forming process S3 and a blanking process S4 while being transferred. At this time, the protrusion-forming process is periodically performed whenever the material S is transferred by a predetermined multiple of a pitch, thus forming protrusions for interlayer division (lower protrusions) on the material. The procedure in which the laminar member L is formed is not limited to the above description.

As described above, the present invention is not limited to the above embodiments, but may be variously modified within the scope of the accompanying claims and equivalents thereof, and elements not described in this embodiment may be the same as those in the above-described first embodiment.

INDUSTRIAL APPLICABILITY

The present invention relates to a core manufacturing apparatus, which manufactures a core used as a rotor or stator of a motor or a generator, and is capable of continuously manufacturing laminate cores and easily dividing the laminate cores into groups by integrating a predetermined number of laminar members into one body by interlayer adhesion between the laminar members.

The invention claimed is:

1. An adhesive laminate core manufacturing apparatus for sequentially forming laminar members having a predetermined shape while transferring a strip-shaped material comprising an adhesive layer applied on a surface thereof by 1 pitch at each cycle and for sequentially manufacturing laminate cores, each comprising laminar members integrated in a predetermined number into one body by interlayer adhesion therebetween, the apparatus comprising:
   a protrusion-forming unit for forming a protrusion for interlayer division on a surface of the material by pressing the material for division of the laminate cores whenever the material is transferred by a predetermined multiple of a pitch;
   a blanking unit disposed further downstream than the protrusion-forming unit in order to sequentially form the laminar members by blanking the material; and
   a laminating unit for sequentially manufacturing the laminate cores by integrating the laminar members,
   wherein the blanking unit comprises:
   a blanking punch provided at an upper press die configured to be capable of being raised and lowered in order to press and blank the material, the blanking punch being disposed further downstream than the protrusion-forming unit in a transfer direction of the material; and
   a blanking die supported by a lower press die disposed under the upper press die, the blanking die comprising a blanking hole facing the blanking punch and being stacked on the laminating unit, and
   wherein the protrusion-forming unit is selectively synchronized with the blanking unit so as to periodically form the protrusion on the material at every predetermined number of iterations of blanking.

2. The adhesive laminate core manufacturing apparatus according to claim 1, wherein the protrusion-forming unit comprises at least one of a first forming set and a second forming set,
   wherein the first forming set comprises a lower forming die provided at the lower press die and an upper forming tool provided at the upper press die so as to face the lower forming die, and
   wherein the second forming set comprises an upper forming die provided at the upper press die and a lower forming tool provided at the lower press die so as to face the upper forming die.

3. The adhesive laminate core manufacturing apparatus according to claim 2, wherein the lower forming die comprises a lower forming recess depressed downwards from a top surface of the lower forming die, and
wherein the upper forming die comprises an upper forming recess indented upwards from a bottom surface of the upper forming die.

4. The adhesive laminate core manufacturing apparatus according to claim 3, wherein the upper forming tool is provided at the upper press die so as to be capable of being raised and lowered, and
wherein the lower forming tool is provided at the lower press die so as to be capable of being raised and lowered.

5. The adhesive laminate core manufacturing apparatus according to claim 3, wherein the lower forming die and the upper forming die are respectively provided at the lower press die and the upper press die so as to be misaligned from each other by a predetermined distance in the transfer direction of the material, and
wherein the upper forming die is disposed further downstream than the lower forming die in the transfer direction of the material.

6. The adhesive laminate core manufacturing apparatus according to claim 5, wherein the first forming set is spaced apart from the second forming set by a distance of 1 pitch.

7. The adhesive laminate core manufacturing apparatus according to claim 3, wherein the top surface of the lower forming die and the bottom surface of the upper forming die have a planar symmetric relationship therebetween such that each of the top surface of the lower forming die and the bottom surface of the upper forming die is a mirror image of a remaining one thereof, and
wherein the upper forming die is located at a position shifted by 1 pitch from a position directly above the lower forming die.

8. The adhesive laminate core manufacturing apparatus according to claim 2, wherein the upper press die comprises an upper frame configured to be capable of being raised and lowered and a pusher having a plate shape, the pusher being provided under the upper frame in order to press the material toward the lower press die,
wherein the upper forming tool is supported by the upper frame so as to press a top surface of the material by penetrating the pusher, and
wherein the lower forming die is supported by the upper frame so as to support the top surface of the material by penetrating the pusher.

9. The adhesive laminate core manufacturing apparatus according to claim 1, wherein the upper press die comprises a plurality of bodies divided in the transfer direction of the material or a single integral body, and
wherein the lower press die comprises a plurality of bodies divided in the transfer direction of the material or a single integral body.

10. The adhesive laminate core manufacturing apparatus according to claim 1, wherein the blanking punch is raised and lowered once by the upper press die whenever the material moves 1 pitch, and
wherein the protrusion-forming unit is selectively synchronized with the blanking unit so as to form the protrusion on the material at an interval equivalent to a multiple of a pitch in a longitudinal direction of the material.

11. The adhesive laminate core manufacturing apparatus according to claim 10, wherein the blanking die is provided at the lower press die so as to be spaced apart from the protrusion-forming unit by an N-pitch distance (N being a natural number equal to or greater than 1) in the transfer direction of the material.

12. The adhesive laminate core manufacturing apparatus according to claim 1, wherein the laminating unit is rotatably provided at the lower press die.

13. The adhesive laminate core manufacturing apparatus according to claim 1, wherein the protrusion-forming unit presses one surface of the material so as to form the protrusion for interlayer division on an opposite surface of the material for division of the laminate cores.

14. The adhesive laminate core manufacturing apparatus according to claim 13, wherein the protrusion-forming unit comprises:
a protrusion-forming tool comprising a pressing protrusion having a flat distal end surface and a distal end portion having a uniform thickness in order to form the protrusion for interlayer division, the protrusion-forming tool being synchronized with the blanking unit so as to press the one surface of the material at a predetermined cycle; and
a forming die comprising a protrusion-forming recess formed at a position facing the pressing protrusion, the protrusion-forming recess having a shape corresponding to a shape of the distal end portion of the pressing protrusion.

15. The adhesive laminate core manufacturing apparatus according to claim 14, wherein the pressing protrusion of the protrusion-forming tool is oriented downwards so as to press a top surface of the material downwards, and
wherein the forming die is disposed under the protrusion-forming tool so as to support a bottom surface of the material.

16. The adhesive laminate core manufacturing apparatus according to claim 15, further comprising:
an ejector installed in the protrusion-forming recess in order to separate the protrusion for interlayer division from the forming die, the ejector being elastically supported toward an entrance of the protrusion-forming recess.

17. The adhesive laminate core manufacturing apparatus according to claim 14, wherein the protrusion-forming tool is selectively lowered by an elevating device in order to press the one surface of the material at the predetermined cycle.

18. The adhesive laminate core manufacturing apparatus according to claim 14, wherein the protrusion-forming tool is provided at an upper support body and the forming die is provided at a lower support body,
wherein the upper support body is provided above the lower support body so as to be capable of being raised and lowered,
wherein the lower support body is provided under the upper support body so as to face the upper support body,
wherein the upper support body is formed integrally with the upper press die or is spaced apart from the upper press die, and
wherein the lower support body is formed integrally with the lower press die or is spaced apart from the lower press die.

19. The adhesive laminate core manufacturing apparatus according to claim 15, wherein the protrusion-forming tool is provided at an upper support body and the forming die is provided at a lower support body, wherein the upper support body is provided above the lower support body so as to be capable of being raised and lowered, wherein the lower support body is provided under the upper support body so as to face the upper support body, wherein the upper support body is formed integrally with the upper press die or is spaced apart from the upper press die, and wherein the lower support body is formed integrally with the lower press die or is spaced apart from the lower press die.

20. The adhesive laminate core manufacturing apparatus according to claim 16, wherein the protrusion-forming tool is provided at an upper support body and the forming die is provided at a lower support body, wherein the upper support body is provided above the lower support body so as to be capable of being raised and lowered, wherein the lower support body is provided under the upper support body so as to face the upper support body, wherein the upper support body is formed integrally with the upper press die or is spaced apart from the upper press die, and wherein the lower support body is formed integrally with the lower press die or is spaced apart from the lower press die.

* * * * *